US012311662B2

(12) United States Patent
Sugawara et al.

(10) Patent No.: US 12,311,662 B2
(45) Date of Patent: May 27, 2025

(54) LIQUID EJECTING HEAD AND LIQUID EJECTING APPARATUS

(71) Applicant: SEIKO EPSON CORPORATION, Tokyo (JP)

(72) Inventors: Yoshiki Sugawara, Mikawa (JP); Keita Moriyama, Matsumoto (JP); Hiroyuki Hagiwara, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 269 days.

(21) Appl. No.: 17/979,799

(22) Filed: Nov. 3, 2022

(65) Prior Publication Data

US 2023/0134134 A1 May 4, 2023

(30) Foreign Application Priority Data

Nov. 4, 2021 (JP) ................................ 2021-180017

(51) Int. Cl.
*B41J 2/14* (2006.01)

(52) U.S. Cl.
CPC ......... *B41J 2/14201* (2013.01); *B41J 2/1433* (2013.01)

(58) Field of Classification Search
CPC .... B41J 2002/14419; B41J 2002/14362; B41J 2/1433; B41J 2/1623; B41J 2/14201; B41J 2202/20; B41J 2/175; B41J 2002/14306; B41J 2202/19; B41J 2/14274
See application file for complete search history.

(56) References Cited

U.S. PATENT DOCUMENTS

2013/0147882 A1 6/2013 Okui et al.
2016/0152030 A1* 6/2016 Nawano .............. B41J 2/16538 347/30

FOREIGN PATENT DOCUMENTS

JP 2016-130026 A 7/2016

* cited by examiner

*Primary Examiner* — Jannelle M Lebron
(74) *Attorney, Agent, or Firm* — Harness, Dickey & Pierce, P.L.C.

(57) ABSTRACT

A first-adhesive surface is provided on an upper portion of a head chip, a holder accommodates the head chip between the holder and a fixing plate and has a second-adhesive surface formed with an opening of a second-supply flow passage communicating with the head chip, the first-adhesive surface and the second-adhesive surface adhere to each other with a first-adhesive so as to define a coupling flow passage coupling between a first-supply flow passage and the second-supply flow passage, the upper portion of the head chip has a first-contact portion, the holder has a first-contacted portion facing the first-contact portion, and a first-dimension between the first-contact portion and the first-contacted portion is smaller than a second-dimension between the first-adhesive surface and the second-adhesive surface.

20 Claims, 11 Drawing Sheets

LIQUID EJECTING HEAD AND LIQUID EJECTING APPARATUS

The present application is based on, and claims priority from JP Application Serial Number 2021-180017, filed Nov. 4, 2021, the disclosure of which is hereby incorporated by reference herein in its entirety.

BACKGROUND

1. Technical Field

The present disclosure relates to a liquid ejecting head that ejects a liquid from a nozzle and a liquid ejecting apparatus, and more particularly, to an ink jet recording head that ejects ink as the liquid and an ink jet recording apparatus.

2. Related Art

For example, an ink jet recording head (hereinafter, simply referred to as a recording head), which is a representative example of a liquid ejecting head that ejects liquid droplets, includes a plurality of head chips that eject ink, a holder holding the plurality of head chips, and a fixing plate to which the holder and the plurality of head chips are fixed (for example, see JP-A-2016-130026).

In the recording head described in JP-A-2016-130026, a space around a communicating part of a liquid introduction flow passage of a holder and a case flow passage of the head chip in a gap between the holder and the head chip is filled with an adhesive, and an upper surface of the head chip and a head mounting surface of the holder adhere to each other by the adhesive.

In the recording head with the configuration described above, the fixing plate is formed with an opening where a nozzle of the head chip is exposed. However, when the opening is sealed with a cap, an external force is applied to the fixing plate by the cap. In addition, when a medium to be recorded comes into contact with the fixing plate, the external force is applied to the fixing plate. When the external force is applied to the fixing plate as such, the adhesive filling a space between the head chip and the holder is crushed, such that the head chip is pushed closer to the holder, which may result in deformation of the fixing plate, which is problematic.

The problem may occur in the ink jet recording head having any configuration, and the same problem exists not only in an ink jet recording head that ejects ink but also in a liquid ejecting head that ejects a liquid other than ink.

SUMMARY

According to an aspect of the present disclosure, there is provided a liquid ejecting head including: a first head chip having a plurality of first nozzles that eject a liquid in an ejecting direction; a holder holding the first head chip; and a fixing plate to which the holder and the first head chip are fixed, having a first opening for exposing the plurality of first nozzles to an outside, in which a first adhesive surface formed with an opening of a flow passage is provided on an upper portion of the first head chip, the holder accommodates the first head chip between the holder and the fixing plate, and has a second adhesive surface formed with an opening of a flow passage communicating with the first head chip, the first adhesive surface and the second adhesive surface adhere to each other with a first adhesive so as to define a coupling flow passage that couples the flow passage communicating with the first head chip of the holder and the flow passage of the first head chip, the upper portion of the first head chip has a first contact portion, the holder has a first contacted portion facing the first contact portion, and a first dimension between the first contact portion and the first contacted portion is smaller than a second dimension between the first adhesive surface and the second adhesive surface.

According to another aspect of the present disclosure, there is provided a liquid ejecting apparatus including the liquid ejecting head in the aspect described above and a transport portion configured to transport a medium.

DESCRIPTION OF EXEMPLARY EMBODIMENTS

Figure 1:
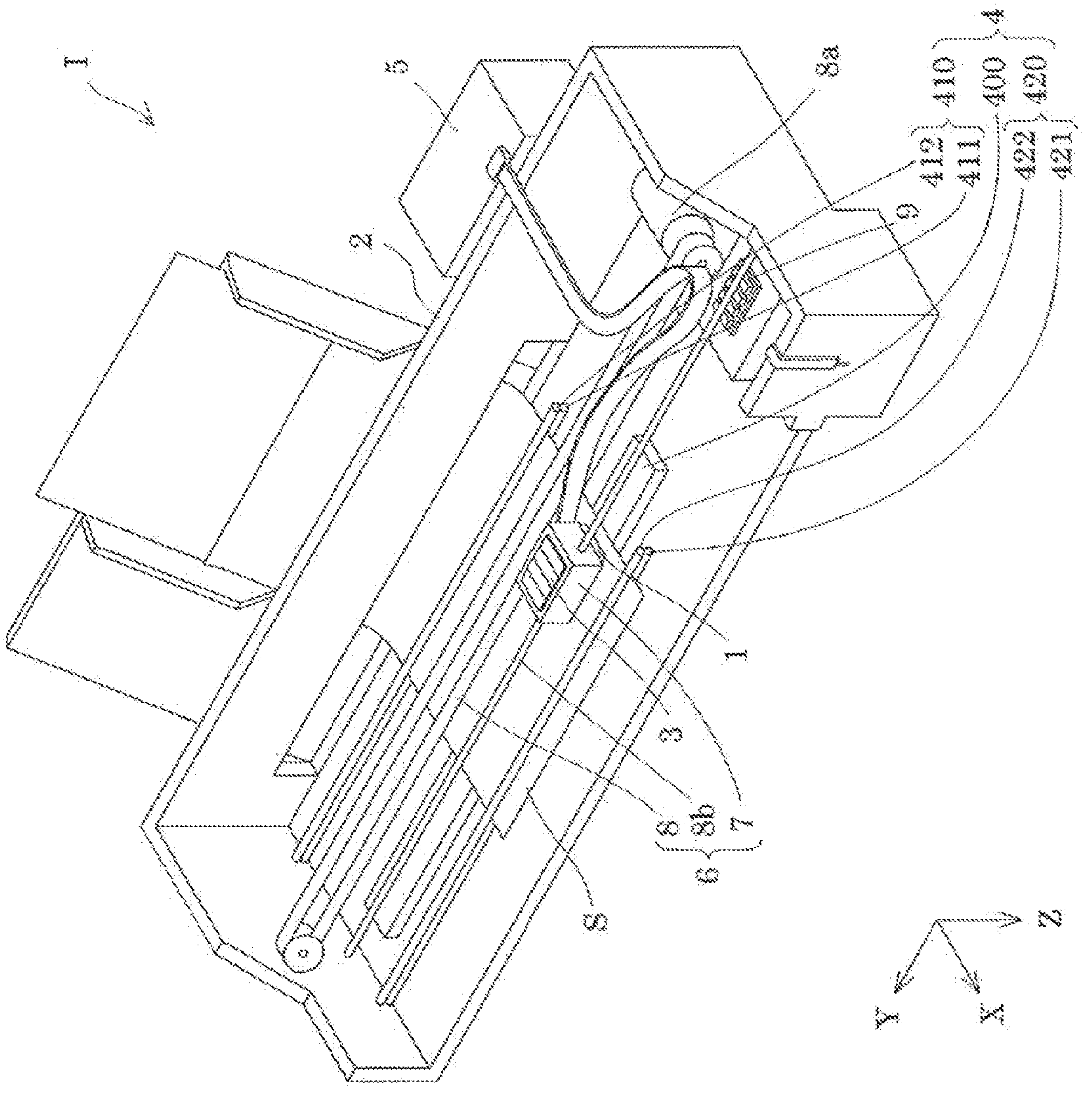
FIG. 1 is a schematic view of an ink jet recording apparatus.

Hereinafter, the present disclosure will be described based on embodiments. However, the following description shows an aspect of the present disclosure, and it is possible to make changes in an arbitrary manner within the scope of the present disclosure. The same reference numeral will be given to the same member in the drawings, and a redundant description thereof will be omitted. In the drawings, X, Y, and Z represent three spatial axes orthogonal to one another. In this specification, directions along these axes are described as X, Y, and Z directions. A direction of an arrow in the drawings is described as a positive (+) direction, and a direction opposite to the arrow is described as a negative (−) direction. The Z direction indicates a vertical direction, a +Z direction indicates a vertically downward direction, and a −Z direction indicates a vertically upward direction. Further, the three spatial axes of X, Y, and Z that do not limit the positive direction and the negative direction will be described as the X axis, the Y axis, and the Z axis, respectively.

First Embodiment

Figure 2:
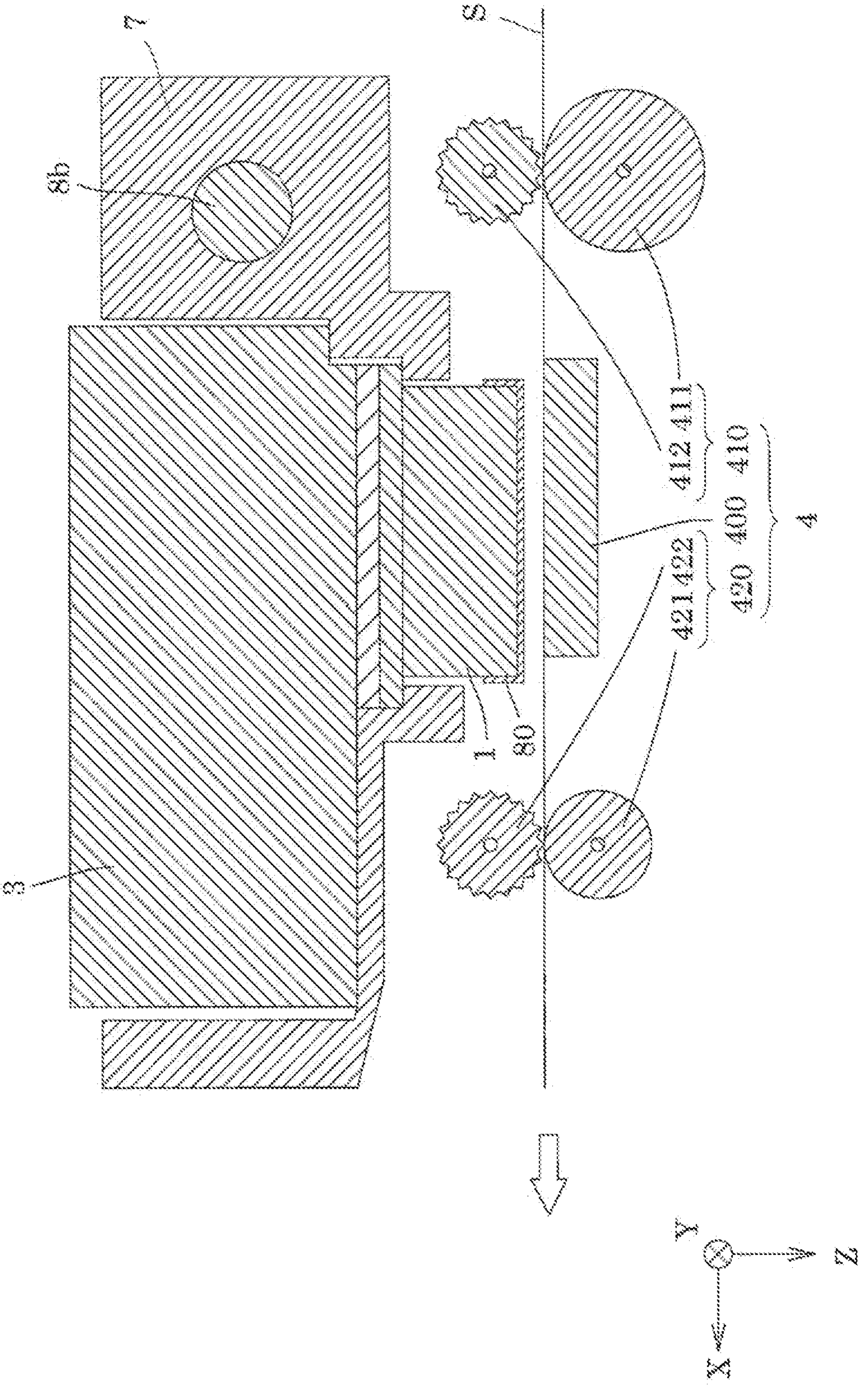
FIG. 2 is a sectional view of an enlarged main portion of the ink jet recording apparatus.

FIG. 1 is a schematic view of an ink jet recording apparatus. FIG. 2 is a sectional view of an enlarged main portion of the ink jet recording apparatus, and is a sectional view taken along a plane perpendicular to the Y axis and passing through an ink jet recording head 1, a transport mechanism 4, and a moving mechanism 6 which will be described later. According to the present disclosure, an ink jet recording apparatus I (hereinafter, simply referred to as "recording apparatus I") is a printing apparatus that performs an image or the like by ejecting and landing ink as droplets, which is a type of the liquid, onto the medium S such as a printing sheet and arranging dots formed on the medium S. As the medium S, any material such as a resin film or cloth can be used in addition to a recording sheet.

The recording apparatus I includes the ink jet recording head 1 (hereinafter, simply referred to as "recording head 1") which is an example of the liquid ejecting head, a liquid container 3, the transport mechanism 4 configured to feed out the medium S, a control unit 5, and the moving mechanism 6. The transport mechanism 4 is an example of a "transport portion".

The liquid container 3 stores the ink ejected from the recording head 1. Examples of the liquid container 3 include a cartridge that can be attached to and detached from the recording apparatus I, a bag-shaped ink pack that is formed of a flexible film, and an ink tank that can refill the ink. In the present embodiment, the cartridge that is attachably and detachably provided on the recording head 1 is used as the liquid container 3. Moreover, the liquid container 3 separately stores inks having a plurality of different colors or types.

The control unit 5 is not particularly illustrated, and includes, for example, a control device such as a central processing unit (CPU) or a field programmable gate array (FPGA), and a storage device such as a semiconductor memory. The control unit 5 generally controls respective components of the ink jet recording apparatus I, that is, the transport mechanism 4, the moving mechanism 6, the recording head 1, and the like, by executing a program stored in the storage device by the control device.

The transport mechanism 4 is controlled by the control unit 5 to transport the medium S in the +X direction. Specifically, the transport mechanism 4 includes a platen 400 provided on an apparatus main body 2, a paper feed unit 410, and a transport unit 420.

The platen 400 is a member extending in the ±Y direction and supporting a surface opposite to a surface of the medium S where the ink is ejected, that is, a surface of the medium S on a +Z direction side. The platen 400 is disposed on the +Z direction side from the recording head 1 at least in a movement range of the recording head 1 in the ±Y direction, and has a surface facing a side of the recording head 1 and supporting the medium S. The platen 400 is disposed on a +X direction side from the paper feed unit 410 which will be described later, and disposed on a −X direction side from the transport unit 420 which will be described later.

The platen 400 may include an adsorption unit for adsorbing the medium S onto the surface of the platen 400 facing the recording head 1. Examples of the adsorption unit include a unit that adsorbs the medium S by suction and a unit that electrostatically adsorbs the medium S by an electrostatic force.

The paper feed unit 410 transports the medium S in the +X direction and feeds the medium S to the recording head 1 disposed on the apparatus main body 2. Specifically, the paper feed unit 410 includes a paper feed roller 411, a paper feed driven roller 412, and a drive unit such as a drive motor (not illustrated), and is disposed on the −X direction side from the recording head 1. The paper feed roller 411 is a member extending in the ±Y direction, which is attached to the apparatus main body 2 in a rotatable manner around the Y axis and rotated by the drive unit. The paper feed driven roller 412 is a member extending in the ±Y direction, which is attached to the apparatus main body 2 in a rotatable manner around the Y axis and driven by the paper feed roller 411. The paper feed roller 411 is disposed on the +Z direction side from the medium S, and the paper feed driven roller 412 is disposed on the −Z direction side from the medium S. The control unit 5 rotates the paper feed roller 411 by driving the drive unit. The medium S passes between the paper feed roller 411 and the paper feed driven roller 412, which are rotating, and is transported to the +X direction side. The paper feed roller 411 may be disposed on the −Z direction side from the medium S, and the paper feed driven roller 412 may be disposed on the +Z direction side from the medium S.

The transport unit 420 transports the medium S in the +X direction and discharges the medium S to the outside of the apparatus main body 2. Specifically, the transport unit 420 includes a transport roller 421, a transport driven roller 422, and a drive unit such as a drive motor (not illustrated), and is disposed on the +X direction side from the recording head 1. The transport roller 421 is a member extending in the ±Y direction, which is attached to the apparatus main body 2 in a rotatable manner around the Y axis and rotated by the drive unit. The transport driven roller 422 is a member extending in the ±Y direction, which is attached to the apparatus main body 2 in a rotatable manner around the Y axis and driven by the transport roller 421. The transport roller 421 is disposed on the +Z direction side from the medium S, and the transport driven roller 422 is disposed on the −Z direction side from the medium S. The control unit 5 rotates the transport roller 421 by driving the drive unit. The medium S passes between the transport roller 421 and the transport driven roller 422, which are rotating, and is transported to the +X direction side. The transport roller 421 is disposed on the −Z direction side from the medium S, and the transport driven roller 422 is disposed on the +Z direction side from the medium S.

The medium S is transported by the paper feed unit 410 in the +X direction and fed to the recording head 1. The medium S is supported by the platen 400 from the +Z direction side, and ink droplets ejected from the recording head 1 are landed onto the medium S. The medium S where the ink droplets are landed is discharged to the outside of the apparatus main body 2 by the transport unit 420.

The transport mechanism 4 configured to transport the medium S is not limited to a structure using a roller such as the paper feed roller 411 or the transport roller 421, and may be a roller transporting the medium S by a belt or a drum.

The moving mechanism 6 is controlled by the control unit 5 to reciprocate the recording head 1 in the ±Y direction. The ±Y direction in which the moving mechanism 6 reciprocates the recording head 1 is a direction intersecting the +X direction in which the medium S is transported.

Specifically, the moving mechanism 6 in the present embodiment includes a holding member 7, a transport belt 8, and a guide rail **8*b* for holding the recording head 1. The holding member 7 is a substantially box-shaped structure accommodating the recording head 1, a so-called carriage, and is fixed to the transport belt 8. The transport belt 8 is an endless belt provided along the ±Y direction. A driving force of a drive motor 8*a* is transmitted to the transport belt 8 under the control of the control unit 5, and the transport belt 8 is rotated, thus reciprocating the recording head 1 together with the holding member 7 along the guide rail 8*b* extending along the ±Y direction. In the recording apparatus I, the recording head 1 ejects the ink to the medium S in parallel with transporting of the medium S and reverse reciprocating of the recording head 1, thereby forming a desired image on a surface of the medium S. The liquid container 3 is mounted on the holding member 7 together with the recording head 1, but the present embodiment is not limited to such a configuration. The liquid container 3 can be mounted in the apparatus main body 2 separately from the recording head 1**.

The recording apparatus I is provided with a cap 9 on the −Y direction side. Although the detailed configuration of the cap 9 will be described later, the cap 9 is a member sealing a nozzle 11 (see FIG. 5) of the recording head 1, which is provided on the recording apparatus I so as to be movable in the ±Z direction. The control unit 5 controls the recording head 1 to move to a position where the recording head 1 overlaps with the cap 9 when viewed in the +Z direction, and controls the cap 9 to move to the recording head 1 side, such that the nozzle 11 is sealed in a closed space 9*a* (see FIG. 7) formed by the cap 9 and the recording head 1.

An example of the recording apparatus I described above includes, but is not limited to, an apparatus that reciprocates the recording head 1 in the ±Y direction. For example, the present disclosure can be also applied to a so-called line recording apparatus in which the recording head 1 is longer than a width of the medium S, and printing is performed only by moving the medium S in the ±X direction without moving the recording head 1 while the liquid is ejected to the medium S for printing.

Figure 3:
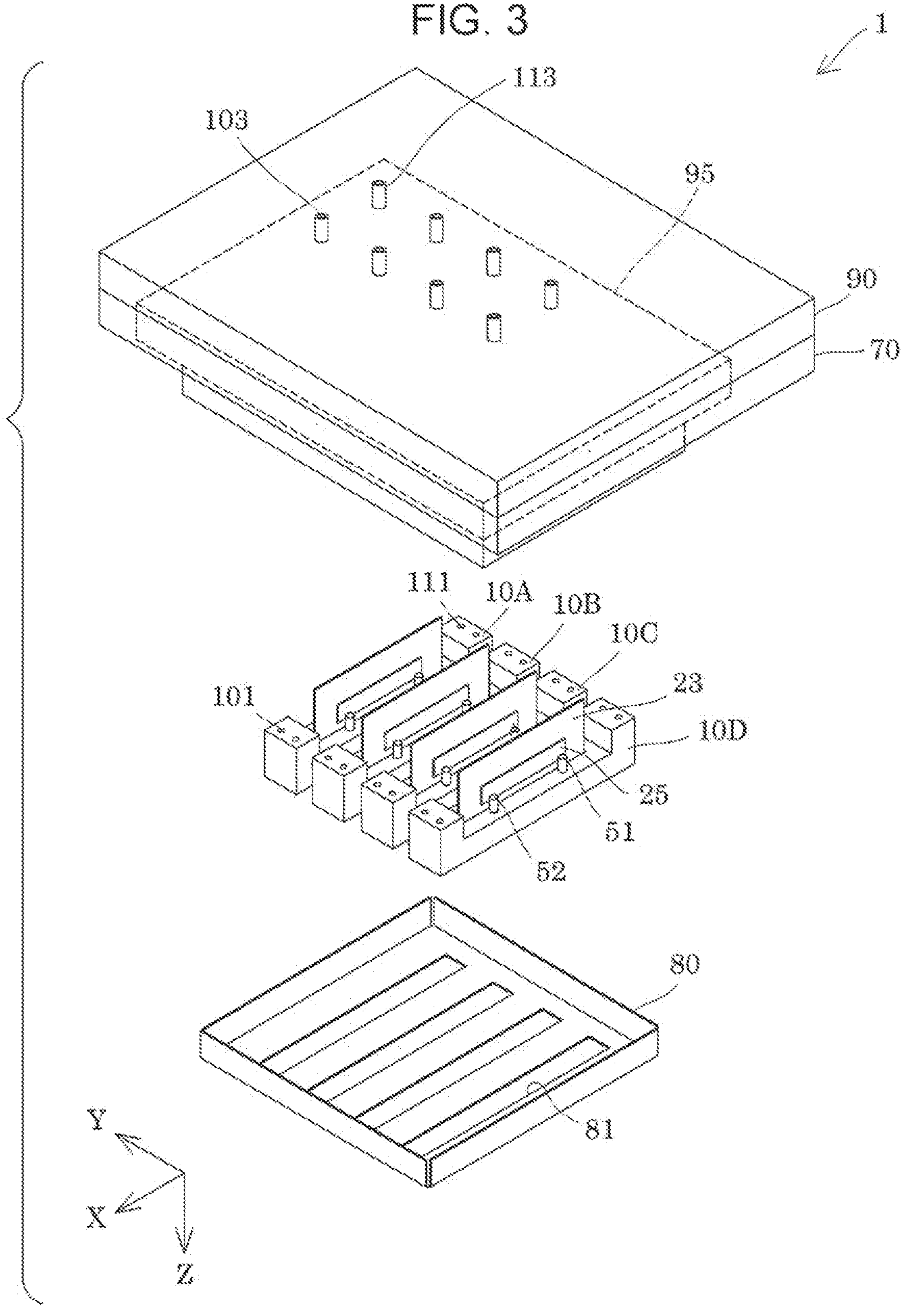
FIG. 3 is an exploded perspective view of a recording head according to a first embodiment.

FIG. 3 is an exploded perspective view of the recording head 1. The recording head 1 includes a head chip 10, a holder 70, and a fixing plate 80. In the present embodiment, one recording head 1 includes four head chips 10, in which a first head chip 10A, a second head chip 10B, a third head chip 10C, and a fourth head chip 10D are arranged from the ±Y direction side to the −Y direction side. The number of head chips 10 held by the holder 70 is not limited to four, may be two or more, or may be one. In addition, the arrangement of a plurality of head chips 10 is not limited to an example illustrated in FIG. 3.

Hereinafter, the description of "head chips 10A to 10D" refers to the first head chip 10A, the second head chip 10B, the third head chip 10C, and the fourth head chip 10D. The configuration common to the head chips 10A to 10D will be described as the head chip 10. The specific configuration of each of the "head chips 10A to 10D" will be described as the first head chip 10A, the second head chip 10B, the third head chip 10C, or the fourth head chip 10D.

Figure 4:
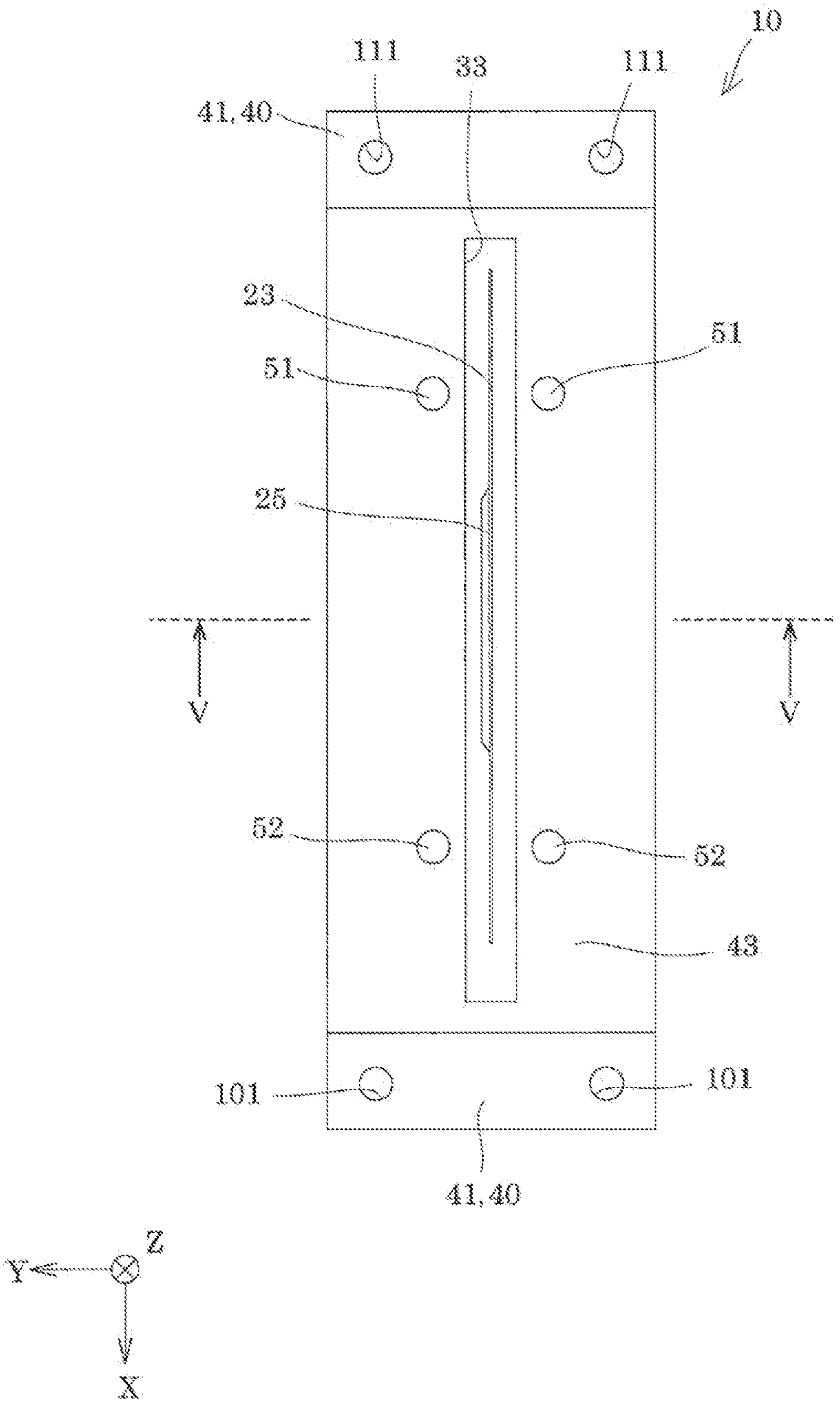
FIG. 4 is a plan view of a head chip according to the first embodiment when viewed in a +Z direction.
Figure 5:
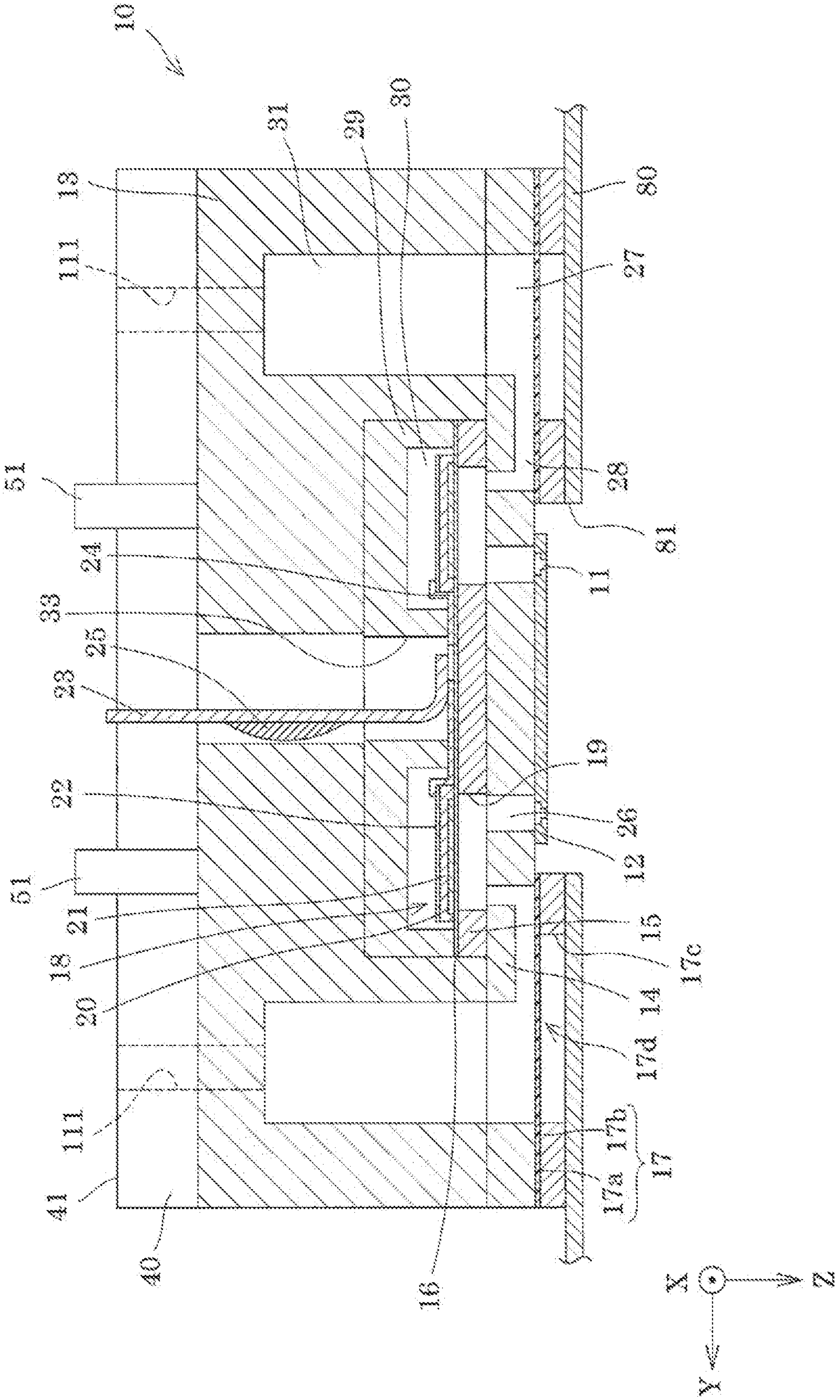
FIG. 5 is a sectional view taken along line V-V in FIG. 4.

An example of the head chip 10 will be described with reference to FIGS. 4 and 5. FIG. 4 is a plan view of the head chip 10 when viewed in the +Z direction, and FIG. 5 is a sectional view taken along line V-V in FIG. 4. FIG. 5 illustrates a section of the fixing plate 80. In the present embodiment, each direction of the head chip 10 will be described based on a direction when the head chip 10 is mounted on the recording head 1.

The head chip 10 includes a plurality of nozzles 11, a case 13, and a flexible substrate 23. The head chip 10 in the present embodiment further includes a communication plate 14, a pressure chamber forming substrate 15, a vibration plate 16, a compliance substrate 17, a piezoelectric actuator 18, and the like. A plurality of constituent members constituting the head chip 10 are stacked and bonded with an adhesive or the like to form a unit.

The plurality of nozzles 11 are formed on a nozzle plate 12 and discharges the ink toward the +Z direction. The nozzle 11 of the first head chip 10A is an example of a "first nozzle", and the nozzle 11 of the second head chip 10B is an example of a "second nozzle". A surface on which the nozzle 11 of the nozzle plate 12 is provided is referred to as a nozzle surface.

The pressure chamber forming substrate 15 has a plurality of pressure chambers 19 communicating the plurality of nozzles 11 formed on the nozzle plate 12, respectively. A plurality of piezoelectric actuators 18 are provided for the corresponding pressure chambers 19. The piezoelectric actuator 18 is a pressure generating element or an energy generating element that generates energy required for pressure fluctuation in the ink in the corresponding pressure chamber 19, that is, for ejecting the ink from the nozzle 11 communicating with the pressure chamber 19. The vibration plate 16 is provided between the pressure chamber 19 and the piezoelectric actuator 18. The vibration plate 16 seals an opening of the pressure chamber 19 on the −Z direction side to partition a part of the pressure chamber 19. The pressure chamber forming substrate 15 and the vibration plate 16 may be integrally formed. The respective piezoelectric actuators 18 are each stacked in a region corresponding to the corresponding pressure chamber 19 on the vibration plate 16. The piezoelectric actuator 18 in the present embodiment has a first electrode 20, a piezoelectric layer 21, and a second electrode 22 which are sequentially stacked on the vibration plate 16. The piezoelectric actuator 18 having such a configuration is bent and deformed when an electric field caused due to a potential difference between the first electrode 20 and the second electrode 22 is applied.

Moreover, the flexible substrate 23 is coupled to the piezoelectric actuator 18. In the present embodiment, each electrode of the piezoelectric actuator 18 and the flexible substrate 23 are coupled to each other through lead-out wiring 24 that is led out from the piezoelectric actuator 18 onto the vibration plate 16. The flexible substrate 23 is mounted with a circuit substrate having a switching element such as a transmission gate for driving the piezoelectric actuator 18 or a drive circuit 25 such as a semiconductor integrated circuit (IC). Such a flexible substrate 23 is led out in the −Z direction of the pressure chamber forming substrate 15. The flexible substrate 23 is not limited to a chip on film (COF) substrate provided with the drive circuit 25 as described above. For example, instead of the flexible substrate 23, flexible wiring on which no drive circuit 25 is mounted, such as flexible flat cable (FFC) and flexible printed circuit (FPC), may be used.

The communication plate 14 having a larger area than the pressure chamber forming substrate 15 is bonded to a surface of the pressure chamber forming substrate 15 on the +Z direction side, in plan view when viewed in the +Z direction. The communication plate 14 is formed with a nozzle communication port 26 for communication between the pressure chamber 19 and the nozzle 11, a common liquid chamber 27 commonly provided in each pressure chamber 19, and a separate communication port 28 for communication between the common liquid chamber 27 and the pressure chamber 19. The common liquid chamber 27 is a space extending along the ±X direction as a direction in which the nozzles 11 are arranged side by side. In the present embodiment, two common liquid chambers 27 are formed corresponding to respective rows of two nozzles 11 provided on the nozzle plate 12. A plurality of separate communication ports 28 are each formed for a corresponding one of the pressure chambers 19 along the ±X direction as a nozzle row direction. The separate communication port 28 communicates with an end portion of the pressure chamber 19, which is opposite to a part communicating with the nozzle communication port 26.

The nozzle plate 12 on which the plurality of nozzles 11 are formed is bonded to a substantially central part of a surface of the communication plate 14 on the +Z direction side. In the present embodiment, the nozzle plate 12 is a plate having an outer shape smaller than that of the communication plate 14, in plan view when viewed in the −Z direction. The nozzle plate 12 is bonded to a region of a surface of the communication plate 14 on the +Z direction side, which is a position away from an opening of the common liquid chamber 27 and in which the nozzle communication port 26 is opened, with an adhesive or the like, in a state in which the nozzle communication ports 26 and the plurality of nozzles 11 communicate with each other. In the present embodiment, the nozzle plate 12 is formed with a total of two nozzle rows (not illustrated) in which the plurality of nozzles 11 are arranged side by side in the ±X direction, which is the nozzle row direction described above. The two nozzle rows are arranged side by side in the ±Y direction.

Moreover, the compliance substrate 17 is bonded to the position away from the nozzle plate 12 on the surface of the communication plate 14 on the +Z direction side. The compliance substrate 17 seals the opening of the common liquid chamber 27 on the surface of the communication plate 14 on the +Z direction side, in a state in which the compliance substrate 17 is positioned on the surface of the communication plate 14 on the +Z direction side and bonded thereto.

In the present embodiment, the compliance substrate 17 includes a flexible sealing film 17*a* formed of a thin film such as resin, and a frame member 17*b* formed of a hard material such as metal of stainless steel or the like. A region facing the common liquid chamber 27 of the frame member 17*b* is a compliance opening portion 17*c* that is totally removed in a thickness direction. Therefore, one surface of the common liquid chamber 27 is a compliance portion 17*d* which is a flexible portion sealed by only the flexible sealing film 17*a*. The compliance portion 17*d* is bent and deformed, thus having a function of reducing the pressure fluctuation in an ink flow passage, particularly, the common liquid chamber 27.

Moreover, a protective substrate 29 having the substantially same size as the pressure chamber forming substrate 15 is bonded to the pressure chamber forming substrate 15 in the −Z direction. The protective substrate 29 has a holding portion 30 which is a space for protecting the piezoelectric actuator 18.

The pressure chamber forming substrate 15, the protective substrate 29, and the communication plate 14 are fixed to the case 13. Inside the case 13, introduction liquid chambers 31 communicating with the common liquid chamber 27 of the communication plate 14 are formed on both sides of the case 13 with the pressure chamber forming substrate 15 being interposed therebetween. Further, the protective substrate 29 and the case 13 are provided with a wiring insertion hole 33 through which the flexible substrate 23 is inserted. The flexible substrate 23 drawn out from the pressure chamber forming substrate 15 in the −Z direction is inserted through the wiring insertion hole 33 of the protective substrate 29 and the case 13, and drawn out to the case 13 on the −Z direction side.

An adhesive portion 40 is provided on an upper portion of the head chip 10, that is, on a part of the case 13 on the −Z direction side. The adhesive portion 40 has a shape protruding from the upper portion of the case 13 to the −Z direction side. In addition, the adhesive portion 40 is provided on each of both ends of the case 13 in the ±X direction. A first supply flow passage 101 for communicating with the introduction liquid chamber 31 is formed in the adhesive portion 40 on the +X direction side. A first discharge flow passage 111 for communicating with the introduction liquid chamber 31 is formed in the adhesive portion 40 on the −X direction side. In the present embodiment, two common liquid chambers 27 are formed in one head chip 10, and each common liquid chamber 27 is provided with one first supply flow passage 101 and one first discharge flow passage 111.

An adhesive surface 41 is a surface of the adhesive portion 40 on the −Z direction side. The first supply flow passage 101 is opened in the adhesive surface 41 of the adhesive portion 40 on the +X direction side, and an opening of the first discharge flow passage 111 is formed in the adhesive surface 41 of the adhesive portion 40 on the −X direction side. Although the details thereof will be described later, the adhesive surface 41 is applied with a first adhesive 45 (see FIG. 6) around the first supply flow passage 101 and the opening of the first discharge flow passage 111 in the adhesive surface 41. The adhesive surface 41 is provided for each of the head chips 10A to 10D. The adhesive surface 41 of the first head chip 10A is an example of a "first adhesive surface", and the adhesive surface 41 of the second head chip 10B is an example of a "third adhesive surface".

Figure 6:
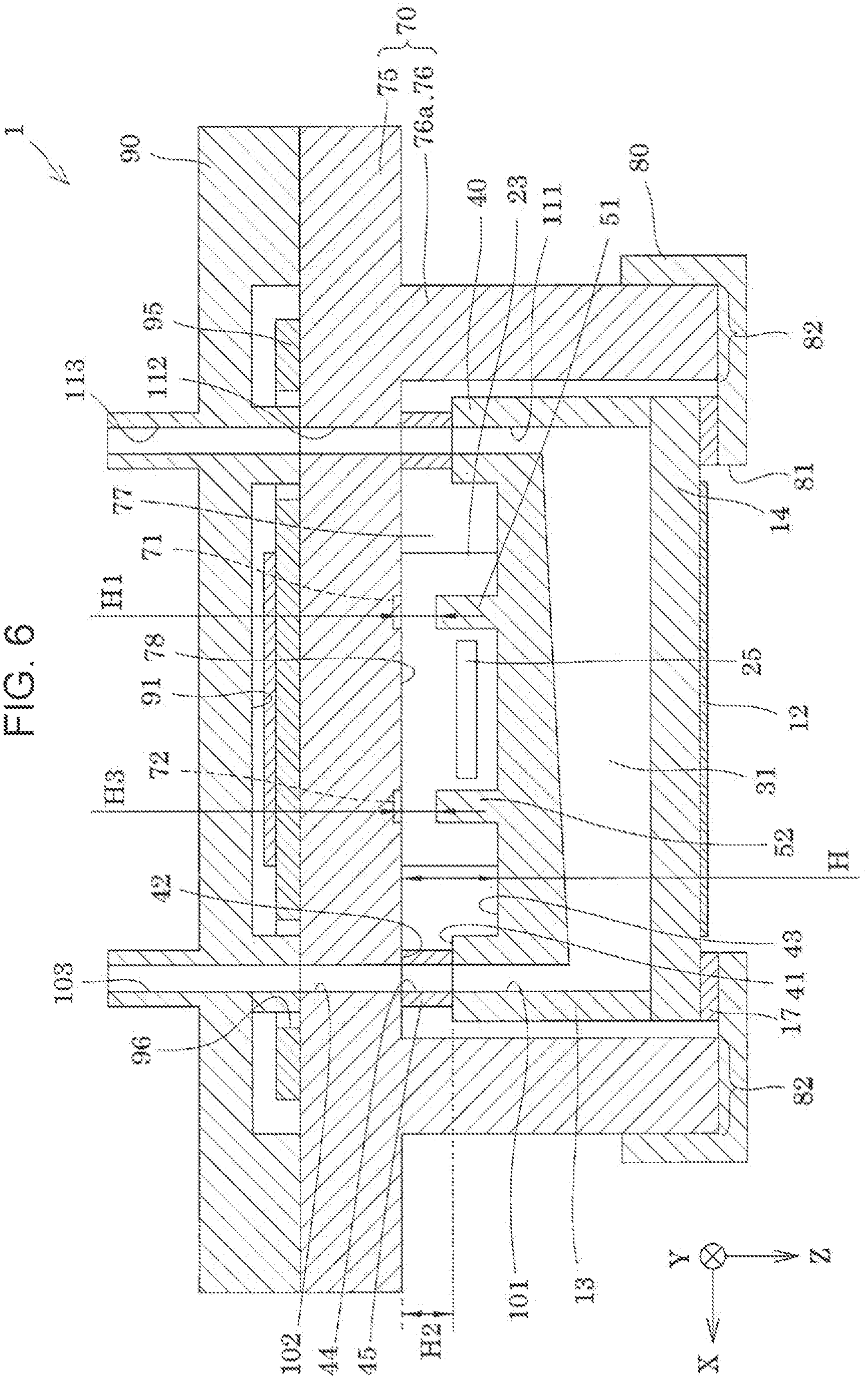
FIG. 6 is a sectional view of the recording head according to the first embodiment.

As illustrated in FIG. 6, a contact portion 51 and a contact portion 52 are provided on the upper portion of the head chip 10. The contact portion 51 faces a contacted portion 71 of the holder 70 which will be describe later, and the contact portion 52 faces a contacted portion 72 of the holder 70 which will be described later. Specifically, the contact portion 51 and the contact portion 52 have a cylindrical shape protruding from the upper portion of the case 13 to the −Z direction side. The shapes of the contact portion 51 and the contact portion 52 are not limited to the cylindrical shape. The contact portion 51 is provided for each of the head chips 10A to 10D. The contact portion 51 of the first head chip 10A is an example of a "first contact portion", and the contact portion 51 of the second head chip 10B is an example of a "third contact portion". In addition, the contact portion 52 provided on the first head chip 10A is an example of a "second contact portion".

Moreover, the contact portion 51 is disposed on the −X direction side, and the contact portion 52 is disposed on the +X direction side, with respect to a longitudinal direction of the head chip 10, in the present embodiment, with respect to the center of the head chip 10 in the ±X direction. In such a disposition, two sets of the contact portion 51 and the contact portion 52 are disposed in the ±Y direction with the wiring insertion hole 33 being interposed therebetween.

A non-contact portion 43 which does not come into contact with the holder 70 is provided on the upper portion of the head chip 10. In the present embodiment, the non-contact portion 43 is a part on the upper portion of the head chip 10 in which the adhesive portion 40, the contact portion 51, and the contact portion 52 are not provided. The non-contact portion 43 is a surface facing the holder 70, and is formed substantially planar.

The adhesive surface 41 and the contact portion 51 located on the −X direction side are disposed so as to interpose the non-contact portion 43 therebetween, when viewed in the +Z direction. Similarly, the adhesive surface 41 and the contact portion 52 located on the +X direction side are disposed so as to interpose the non-contact portion 43 therebetween when viewed in the +Z direction.

Moreover, an area of the non-contact portion 43 is larger than that of the contact portion 51, when viewed in the +Z direction. Similarly, the area of the non-contact portion 43 is larger than that of the contact portion 52, when viewed in the +Z direction. In addition, the non-contact portion 43 is larger than the contact portion 51 and the contact portion 52, in the ±X direction which is the longitudinal direction of the head chip 10 and the ±Y direction which is a transverse direction of the head chip 10.

Moreover, the contact portion 51 is located in the −Z direction opposite to the +Z direction, which is an ink ejecting direction, from the adhesive surface 41. Similarly, the contact portion 52 is located in the −Z direction opposite to the +Z direction, which is the ink ejecting direction, from the adhesive surface 41.

Figure 7:
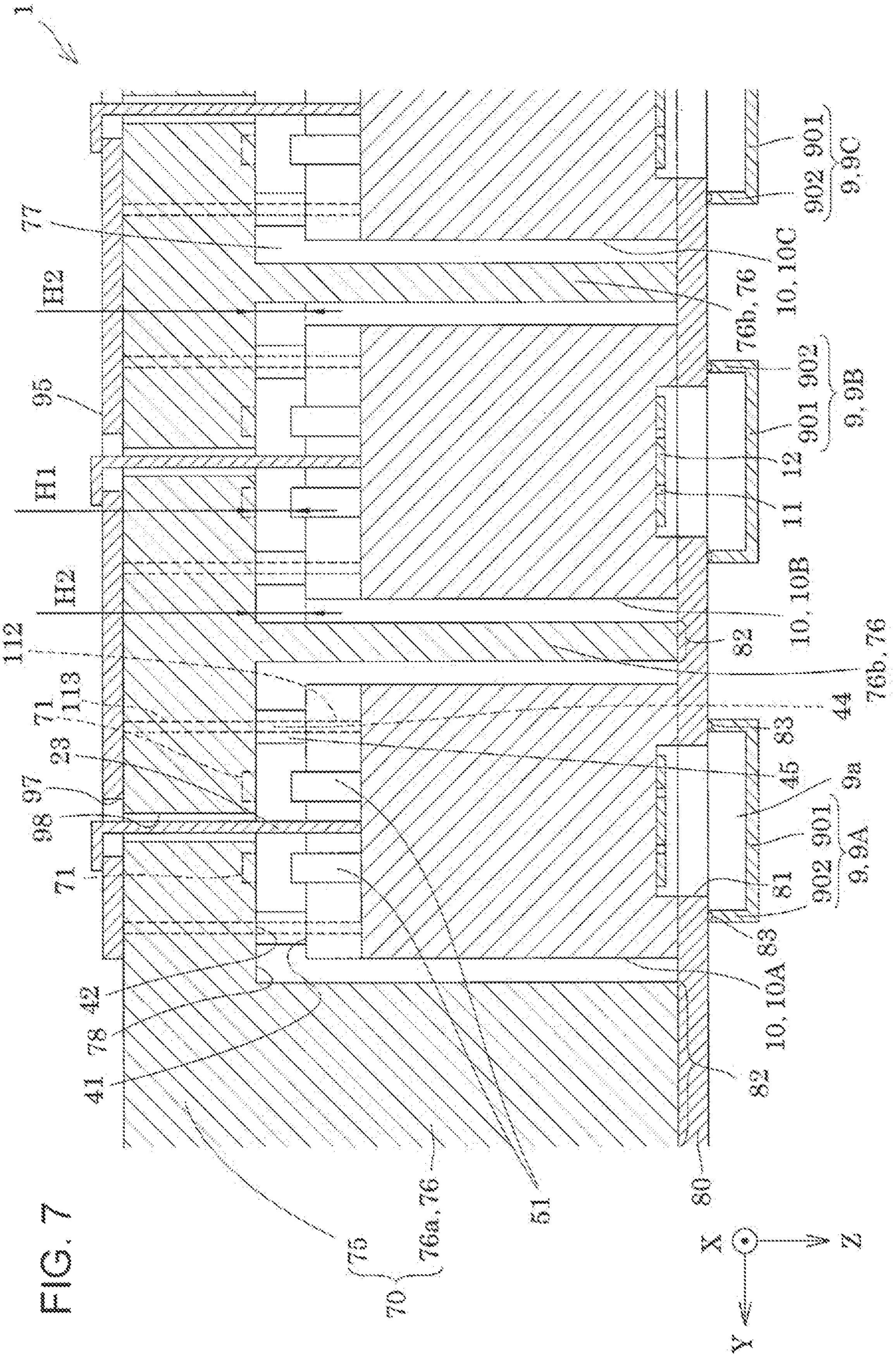
FIG. 7 is a sectional view of an enlarged main portion of the recording head according to the first embodiment.
Figure 8:
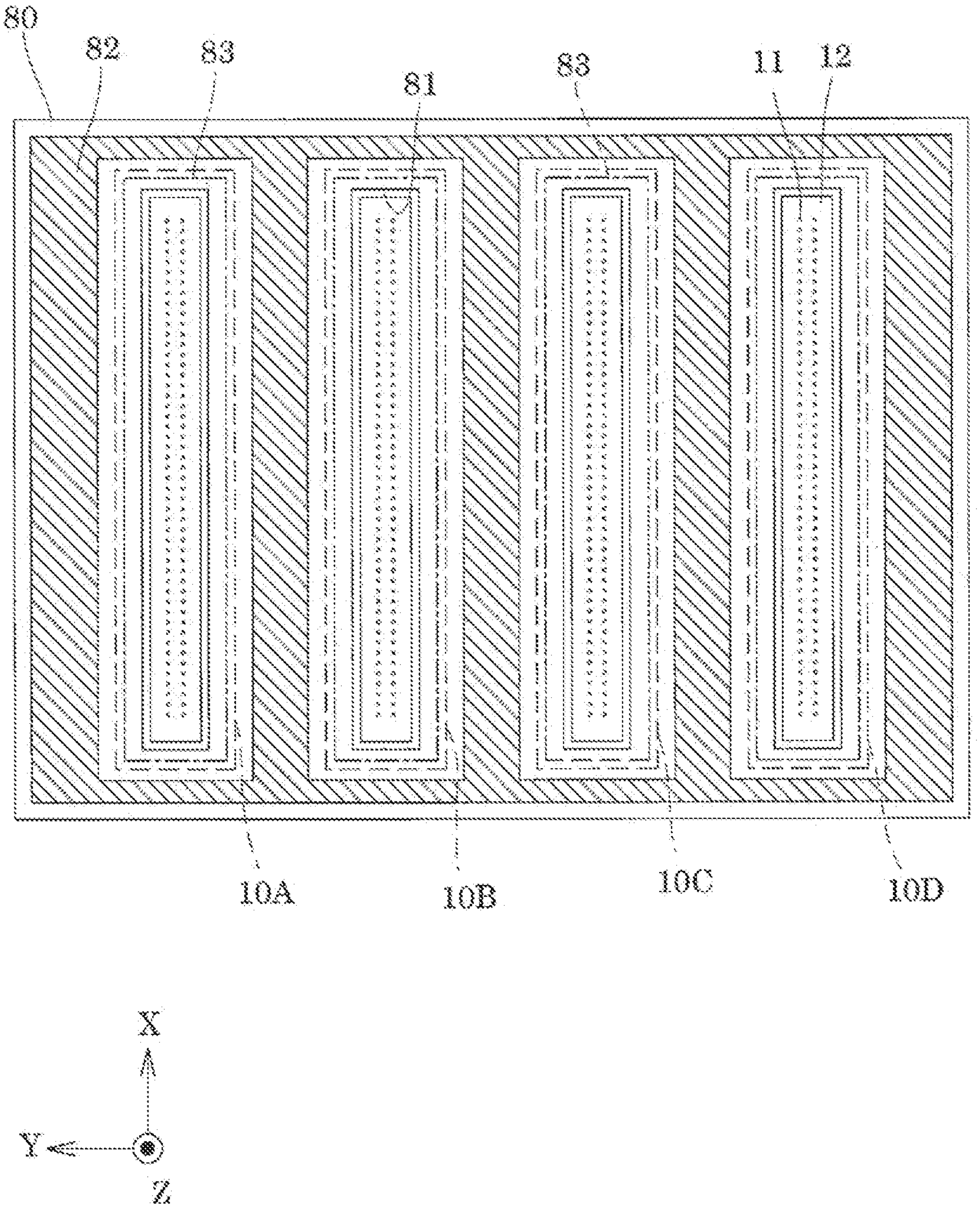
FIG. 8 is a plan view of a recording head according to the first embodiment when viewed in a −Z direction.

Configurations of the holder 70 for holding the head chip 10, the fixing plate 80, a circuit substrate 95, and a flow passage member 90 will be described with reference to FIGS. 3, 6, 7, and 8. FIG. 6 is a sectional view of the recording head 1 with an appropriately bent sectional line, so as to include the adhesive surface 41, the introduction liquid chamber 31, the first supply flow passage 101, the contact portion 51, and the contact portion 52. FIG. 7 is a sectional view of an enlarged main portion of the recording head 1 taken along a plane, as a section, perpendicular to the ±X direction and passing through the center of the head chip 10 in the ±X direction. FIG. 8 is a plan view of the recording head 1 when viewed in the −Z direction. In FIG. 8, a broken line indicates an outer shape of each of the head chips 10A to 10D, an alternate long and short dash line indicates an abutting position 83 which will be described later, and a hatching region indicates a fixed position 82 which will be described later.

The holder 70 is a member holding the four head chips 10 and accommodating the four head chips 10 between the holder 70 and the fixing plate 80. Specifically, the holder 70 includes a plate-shaped base portion 75, an outer peripheral wall 76 protruding from the base portion 75 to the +Z direction side. The plurality of head chips 10 are accommodated in a plurality of accommodating portions 77 formed by a surface of the base portion 75 on the +Z direction side and an inner surface of the outer peripheral wall 76. As understood from FIGS. 6 to 8, the outer peripheral wall 76 includes a frame-shaped outermost wall 76*a* and a plurality of partition wall portions 76*b*, when viewed in the −Z direction. Specifically, when viewed in the −Z direction, the outermost wall 76*a* is provided to surround the four head chips 10, and the plurality of partition wall portions 76*b* divide the accommodating portion 77 surrounded by the outermost wall 76*a* into a plurality of portions. That is, each head chip 10 is disposed one by one in the accommodating portion 77, which is a space surrounded by a part of the outermost wall 76*a* and one or more partition wall portions 76*b*, when viewed in the −Z direction. In the present embodiment, because three partition wall portions 76*b* are provided, four accommodating portions 77 are provided corresponding to the four head chips, respectively. The outer peripheral wall 76 may include only the outermost wall 76*a* without having the partition wall portion 76*b*, and may accommodate the plurality of head chips in one accommodating portion 77. Further, the number of partition wall portions 76*b* may be any number including zero.

The holder 70 has a second supply flow passage 102 and a second discharge flow passage 112, which penetrate the base portion 75 in the ±Z direction, as examples of a flow passage communicating with the head chip 10. In the present embodiment, two second supply flow passages 102 are provided corresponding to two first supply flow passages 101 provided in the head chip 10. Similarly, two second discharge flow passages 112 are provided corresponding to two first discharge flow passage 111 provided in the head chip 10.

An adhesive surface 42 is a surface of the holder 70 on the +Z direction side and a surface applied with the first adhesive 45 which will be described later. The adhesive surface 42 is formed with openings of the second supply flow passage 102 and the second discharge flow passage 112. The adhesive surface 42 is provided on the holder 70 corresponding to each of the head chips 10A to 10D. However, the adhesive surface 42 provided on the holder 70 corresponding to the first head chip 10A is an example of a "second adhesive surface", and the adhesive surface 42 provided on the holder 70 corresponding to the second head chip 10B is an example of a "fourth adhesive surface".

Moreover, the holder 70 has the contacted portion 71 facing the contact portion 51, and the contacted portion 72 facing the contact portion 52. In the present embodiment, a bottom surface 78 of the holder 70 on the +Z direction side inside the outer peripheral wall 76 is formed planar, and the contacted portion 71 is a part of the bottom surface 78 facing the contact portion 51. In addition, the contacted portion 72 is a part of the bottom surface 78 facing the contact portion 52. Two contacted portions 71 are provided corresponding to two contact portions 51, respectively, and two contacted portions 72 are provided corresponding to two contact portions 52, respectively. The contacted portion 71 is provided on the holder 70 corresponding to each of the head chips 10A to 10D. The contacted portion 71 provided on the holder 70 corresponding to the first head chip 10A is an example of a "first contacted portion", and the contacted portion 71 provided on the holder 70 corresponding to the second head chip 10B is an example of a "third contacted portion". The contacted portion 72 is provided on the holder 70 corresponding to each of the head chips 10A to 10D. The contacted portion 72 provided on the holder 70 corresponding to the first head chip 10A is an example of a "second contacted portion".

A flow passage member 90 is provided in the holder 70 on the −Z direction side. The flow passage member 90 has a third supply flow passage 103 which is a flow passage through which the ink is supplied from the liquid container 3 on a surface of flow passage member 90 on the −Z direction side. In addition, the flow passage member 90 has a third discharge flow passage 113 as a flow passage through which the ink is discharged from the head chip 10 on a surface of flow passage member 90 on the −Z direction side.

Although not particularly illustrated, the third supply flow passage 103 is branched so as to have one opening that is coupled to the liquid container 3 and two openings coupled to the second supply flow passage 102 of the holder 70. As described above, two first supply flow passages 101 are provided in one head chip 10, and two second supply flow passages 102 are provided in the holder 70 corresponding to the two first supply flow passages 101. The third supply flow passage 103 is branched in order to supply the ink from one liquid container 3 to the two second supply flow passages 102. Four third supply flow passages 103 are provided corresponding to the number of liquid containers 3, which is four in the present embodiment.

Although not particularly illustrated, the third discharge flow passage 113 is branched so as to have one opening that is coupled to the liquid container 3 and two openings coupled to the second discharge flow passage 112 of the holder 70. As described above, two first discharge flow passages 111 are provided in one head chip 10, and two second discharge flow passages 112 are provided in the holder 70 corresponding to the two first discharge flow passages 111. The third discharge flow passage 113 is merged in order to discharge the ink from the two second discharge flow passages 112 to one liquid container 3. Four third discharge flow passages 113 are provided corresponding to the number of liquid containers 3, which is four in the present embodiment.

The holder 70 holds the circuit substrate 95 between the holder 70 and the flow passage member 90. Specifically, a recessed portion 91 is formed in a surface of the flow passage member 90 on the +Z direction side. The circuit substrate 95 is fixed to the flow passage member 90 on the +Z direction side and the holder 70 on the −Z direction side, and is accommodated in a space formed by the recessed portion 91 and the holder 70, in a state in which the circuit substrate 95 is located on the holder 70, that is, stacked on the holder 70.

The circuit substrate 95 is a rigid substrate that is common to the plurality of flexible substrates 23 of the plurality of head chips 10. The base portion 75 of the holder 70 is formed with a first substrate insertion hole 98 which penetrates in the ±Z direction and through which the flexible substrate 23 can be inserted. Further, the circuit substrate 95 is formed with a second substrate insertion hole 97 which penetrates in the ±Z direction and through which the flexible substrate 23 can be inserted. The flexible substrate 23 of each head chip 10 is folded by being inserted through the first substrate insertion hole 98 and the second substrate insertion hole 97, and electrically coupled to a surface of the circuit substrate 95 on the −Z direction side. Further, the circuit substrate 95 is provided with a first insertion hole 96 through which the third supply flow passage 103 and the third discharge flow passage 113 are inserted. The third supply flow passage 103 is inserted through the first insertion hole 96 and coupled to the second supply flow passage 102. The third discharge flow passage 113 is inserted through the first insertion hole 96 and coupled to the second discharge flow passage 112.

Moreover, the fixing plate 80 is fixed to each head chip 10. The fixing plate 80 is a plate-shaped member formed of a metal material such as stainless steel, and includes an opening 81 for exposing the plurality of nozzles 11 of the head chip 10 to the outside. In the present embodiment, a plurality of openings 81 are independently formed for each head chip 10 so as to have a size in which the nozzle plate 12 of the head chip 10 is exposed. In this case, the opening 81 that exposes the plurality of nozzles 11 of the first head chip 10A to the outside is an example of a "first opening", and the opening 81 that exposes the plurality of nozzles 11 of the second head chip 10B to the outside is an example of a "second opening".

The head chip 10 is fixed to the fixing plate 80. The "head chip 10 is fixed to the fixing plate 80" means that the fixing plate 80 is fixed to the head chip 10 on the +Z direction side. The "head chip 10 is fixed to the fixing plate 80" is not limited to a portion of the head chip 10 to which the fixing plate 80 is fixed, and in the present embodiment, means that the fixing plate 80 is fixed to the compliance substrate 17. Of course, the present embodiment is not limited to such a configuration, for example, the fixing plate 80 may be fixed to the nozzle plate 12.

Moreover, the holder 70 is fixed to the fixing plate 80. In the present embodiment, the fixing plate 80 is fixed to the outer peripheral wall 76 of the holder 70. That is, a tip of the outer peripheral wall 76 on the +Z direction side is fixed to the fixing plate 80. A part of the fixing plate 80 to which the outer peripheral wall 76 is fixed is referred to as the fixed position 82. When viewed in the −Z direction, the outer peripheral wall 76, in other words, the outermost wall **76*a* and the partition wall portion 76*b* surround the head chip 10 at an interval from the head chip 10**.

As described above, the head chip 10 of which the +Z direction side is fixed to the fixing plate 80 adheres to the holder 70 with the first adhesive 45 on the −Z direction side. Specifically, the adhesive surface 41 of the head chip 10 and the adhesive surface 42 of the holder 70 adhere to each other with the first adhesive 45.

The first adhesive 45 adheres to the head chip 10 and the holder 70, and defines a coupling flow passage 44 coupled between the first supply flow passage 101 and the second supply flow passage 102. Similarly, the first adhesive 45 defines the coupling flow passage 44 coupled between the first discharge flow passage 111 and the second discharge flow passage 112. The first adhesive 45 is not necessarily provided on the entire surface of the adhesive surface 41 or adhesive surface 42, and may be provided in the vicinity of the openings of the first supply flow passage 101, the second supply flow passage 102, the first discharge flow passage 111, and the second discharge flow passage 112. As the first adhesive 45, for example, a silicone-based adhesive can be used, but the present embodiment is not limited thereto.

It has been described that the holder 70 accommodates the head chip 10 between the holder 70 and the fixing plate 80. However, this means that the head chip 10 on the +Z direction side is fixed to the fixing plate 80, and the head chip 10 on the −Z direction side adheres to the holder 70, in a state in which the head chip 10 is disposed between the holder 70 and the fixing plate 80.

In the recording head 1 including the head chip 10 of the above-described configuration, the ink in the liquid container 3 is supplied to the first supply flow passage 101 of the head chip 10 through the third supply flow passage 103 provided in the flow passage member 90, the second supply flow passage 102 provided in the holder 70, and the coupling flow passage 44 formed by the first adhesive 45. In a state in which the flow passage from the first supply flow passage 101 to the introduction liquid chamber 31, the nozzle 11 passing through the common liquid chamber 27 and the pressure chamber 19 is filled with the ink, the piezoelectric actuator 18 is driven, and the pressure fluctuation in the ink thus occurs in the pressure chamber 19, and the ink is ejected from a predetermined nozzle 11 due to the pressure fluctuation. In addition, in the recording head 1, the ink that has not been ejected from the nozzle 11 is discharged from the introduction liquid chamber 31 to the first discharge flow passage 111, the coupling flow passage 44, the second discharge flow passage 112, and the third discharge flow passage 113. The recording head 1 is a circulation-type recording head 1 in which the ink discharged from the third discharge flow passage 113 is supplied from the third supply flow passage 103 to the head chip 10 again.

As illustrated in FIGS. 1 and 7, the recording apparatus I is provided with the cap 9 corresponding to each head chip 10 that is accommodated between the holder 70 and the fixing plate 80.

That is, the caps 9 are separately provided for the head chips 10A to 10D and are also referred to as caps 9A, 9B, 9C, and 9D (the cap 9D is not illustrated in FIG. 7). Hereinafter, the description of the "caps 9A to 9D" means the caps 9A, 9B, 9C, and 9D. The configuration common to the caps 9A to 9D will be described as the cap 9.

Each of the caps 9A to 9D has a shape capable of closing the openings 81 provided corresponding to the head chips 10A to 10B, respectively. The "first cap" corresponds to the cap 9A provided on the first head chip 10A, and the "second cap" corresponds to the cap 9B provided on the second head chip 10B.

The apparatus main body 2 includes the cap 9 as a constituent element of a maintenance unit (not illustrated). The maintenance unit includes the cap 9, a moving mechanism (not illustrated) for moving the cap 9, and a suction pump (not illustrated).

The cap 9 is a bottomed box-shaped member that is open to the −Z direction side and has a plate-shaped bottom portion 901 facing the nozzle plate 12 and a wall portion 902 extending from each side of the bottom portion 901 to the −Z direction side. A shape of the opening of the cap 9 is at least larger than that of the opening 81 of the fixing plate 80.

The recording head 1 can move to the −Y direction side along the guide rail 8*b* and stop at a predetermined position on the −Y direction side from the −Y direction side from a range in which the medium S is transported. The predetermined position is referred to as a cap position. When the recording head 1 is stopped at the cap position, the cap 9 is disposed to face the nozzle plate 12 when viewed in the +Z direction and to cover the opening 81.

A cap moving mechanism of the maintenance unit moves the cap 9 in the ±Z direction. In a state in which the recording head 1 stops at the cap position, the control unit 5 controls the cap moving mechanism to move the cap 9 to the −Z direction side. Due to the operation of the cap moving mechanism, the cap 9 moves from the +Z direction side to the −Z direction side at a position that is located inside the fixed position 82 and overlaps the head chip 10, and comes into contact with the fixing plate 80, when viewed in the +Z direction. As illustrated in FIGS. 7 and 8, a part of the fixing plate 80 which abuts a surface of the wall portion 902 of the cap 9 on the −Z direction side is the abutting position 83. The abutting position 83 is located outside the opening 81 of the fixing plate 80 and inside the fixed position 82.

The wall portion 902 of the cap 9 comes into contact with the abutting position 83 of the fixing plate 80 to close the opening 81, such that the closed space 9*a* is formed by a part where the nozzle plate 12 of the recording head 1 is exposed to the opening 81, an inner peripheral surface of the opening 81, and the cap 9. That is, the cap 9 functions as a seal that shields the nozzle 11 from the outside air. Therefore, it is possible to shield the nozzle 11 of the nozzle plate 12 from the outside air by forming the closed space 9*a* to stop the recording head 1 at the cap position and cover the nozzle plate 12 by the cap 9. As a result, since the nozzle 11 can be moisturized, it is possible to prevent the ink from thickening in the vicinity of the nozzle 11, for example.

The suction pump of the maintenance unit sets the closed space 9*a* formed by the cap 9 to a negative pressure. For example, the cap 9 is provided with a communication path (not illustrated) for allowing the closed space 9*a* to communicate with the outside, and it is possible to set the closed space 9*a* to a negative pressure through the communication path.

By setting the closed space 9*a* to the negative pressure by operating the suction pump in a state in which the closed space 9*a* is formed by the cap 9, it is possible to perform cleaning in which the ink thickened in the ink flow passage of the recording head 1, air bubbles, and the like accumulated in the flow path are forcibly discharged from the nozzle 11. The cap 9 can also be used for receiving the ink ejected from the nozzle 11 by flushing without operating the suction pump.

In this case, a dimension between the contact portion 51 and the contacted portion 71 is defined as a first dimension H1. A dimension between the adhesive surface 41 and the adhesive surface 42 is defined as a second dimension H2. A dimension between the contact portion 52 and the contacted portion 72 is defined as a third dimension H3. The first dimension H1 is smaller than the second dimension H2, and the third dimension H3 is smaller than the second dimension H2. In a relationship in size between the first dimension H1 and the third dimension H3, one of the first dimension H1 and the third dimension H3 may be larger than the other dimension, or the first dimension H1 and the third dimension H3 may be substantially the same as each other. In addition, the contact portion 51 and the contacted portion 71 may be in contact with each other. That is, the first dimension H1 may be zero. The contact portion 52 and the contacted portion 72 may be in contact with each other. That is, the third dimension H3 may be zero. As for the second head chip 10B, a "fourth dimension" between the "third contact portion" and the "third contacted portion" corresponds to the first dimension H1 in the first head chip 10A, but the "fourth dimension" is smaller than the second dimension H2.

For example, the second dimension is 0.14±0.11 mm (tolerance at the time of manufacturing). That is, the second dimension H2 is within a range of 0.03 to 0.25 mm. The first dimension H1 is preferably narrower than 0.03 mm, which is the minimum gap of the second dimension H2 in consideration of the tolerance. In other words, the first dimension H1 is preferably about 0.00 mm to 0.029 mm. Specifically, the first dimension H1 is more preferably 0.020±0.009 mm, that is, about 0.011 mm to 0.029 mm. By setting the first dimension H1, the second dimension H2, and the third dimension H3 as such, deformation of the fixing plate 80 can be prevented as follows.

Moreover, a dimension between the non-contact portion 43 and a part facing the non-contact portion 43 of the holder 70 is defined as a dimension H. The dimension H is larger than the second dimension H2. That is, on the upper portion of the head chip 10, the contact portion 51 and the contact portion 52 come into contact with the holder 70, and the other non-contact portion 43 does not come into contact with the holder 70.

As described above, the fixing plate 80 is fixed to the tip of the outer peripheral wall 76 of the holder 70, and fixed to the head chip 10 that is disposed at an interval from the outer peripheral wall 76. When the fixing plate 80 comes into contact with the cap 9 inside the fixed position 82 and at the abutting position 83 that overlaps with the head chip 10 when viewed in the +Z direction, an external force is applied to the −Z direction side in the vicinity of the head chip 10 of the fixing plate 80.

When the external force is applied to the fixing plate 80 by the cap 9, the head chip 10 is pushed in the −Z direction, and the first adhesive 45 is crushed. However, since the first dimension H1 is smaller than the second dimension H2, the contact portion 51 and the contacted portion 71 come into contact with each other. The contact restricts the head chip 10 from moving in the −Z direction due to the external force of the cap 9. The movement of the head chip 10 to the −Z direction is restricted, such that it is possible to prevent the fixing plate 80 from being deformed in the −Z direction side.

Moreover, the external force due to the medium S may be applied to the fixing plate 80. For example, when the medium S having the bent part or the wrinkled part is transported, or when the medium S has the bent part or winkled part in the middle of the transporting, the bent part or the wrinkled part reaches a space between the recording head 1 and the platen 400 (see FIG. 2), such that the external force that allows the fixing plate 80 to be pressurized on the −Z direction side may be applied. Particularly, when the medium S is cloth, a thickness of the bent part or the wrinkled part in the ±Z direction tends to be thick, and the external force applied to the fixing plate 80 tends to be large. However, since the recording head 1 in the present embodiment can restrict the movement of the head chip 10 in the −Z direction by the contact between the contact portion 51 and the contacted portion 71 due to the external force of the medium S as described above, the recording head 1 can prevent the deformation of the fixing plate 80 even with respect to the external force caused by the medium S.

The Young's modulus of the contact portion 51 and the contact portion 52 is higher than that of the first adhesive 45. Specifically, the contact portion 51 and the contact portion 52 are rigid bodies that are not deformed by the external force applied from the cap 9 or the medium S via the fixing plate 80. In the present embodiment, the contact portion 51 and the contact portion 52 are formed as a part of the case 13. Examples of a material constituting such a case 13 include resin, metal and ceramic. The contact portion 51 and the contact portion 52 may be separated from the case 13.

The Young's moduli of the contacted portion 71 and the contacted portion 72 are higher than that of the first adhesive 45. Specifically, the contacted portion 71 and the contacted portion 72 are rigid bodies that are not deformed by the external force applied from the cap 9 or the medium S via the fixing plate 80. In the present embodiment, the contacted portion 71 and the contacted portion 72 are a part of the holder 70. Examples of a material constituting such a holder 70 include resin, metal, and ceramic. The contacted portion 71 and the contacted portion 72 may be separated from the holder 70.

The resin constituting the case 13 or the holder 70 may be, for example, a thermoplastic resin or a thermosetting resin. Examples of the thermoplastic resin include polyphenylene ether resin (PPE), modified polyphenylene ether resin (m-PPE), polyethylene resin (PE), polystyrene resin (PS), polyamide resin (PA), PPS, PP, LCP, ABS resin, vinyl chloride-vinyl acetate copolymer resin, polyvinyl chloride resins, and mixtures thereof. In addition, examples of the thermosetting resin include phenolic resin such as bakelite, epoxy resin such as epoxy glass, urethane resin, melamine resin, and ester resin. The case 13 or the holder 70 is preferably formed using the thermosetting resin having excellent temperature stability, liquid resistance, and high rigidity.

As described above, the recording head 1 according to the present embodiment includes the head chip 10, the holder 70, and the fixing plate 80, and the head chip 10 is accommodated between the holder 70 and the fixing plate 80. The adhesive surface 41, the contact portion 51, and the contact portion 52 are provided on the head chip 10, and the adhesive surface 42, the contacted portion 71, and the contacted portion 72 are provided on the holder 70. The head chip 10 adheres to the adhesive surface 42 with the first adhesive 45 on the adhesive surface 41, and is fixed to the fixing plate 80. The first dimension H1 is smaller than the second dimension H2, and the third dimension H3 is smaller than the second dimension H2.

Even when the external force in the −Z direction is applied to the head chip 10 via the fixing plate 80, the recording head 1 can come into contact with the contact portion 51 and the contacted portion 71 for making the first dimension H1 smaller than the second dimension H2, and restrict movement of the head chip 10 to the −Z direction by the external force of the cap 9. Since the movement of the head chip 10 to the −Z direction is restricted, such that it is possible to prevent the fixing plate 80 from being deformed.

Moreover, the head chip 10 and the holder 70 are fixed with the first adhesive 45. Therefore, an inclination of the nozzle surface due to a dimensional error of each head chip 10 can be adjusted by changing a thickness of the first adhesive 45 in the ±Z direction when the head chip 10 is attached to the holder 70. Particularly, the thickness of the first adhesive 45 in the ±Z direction is easily changed by adopting a silicone-based adhesive having a relatively small Young's modulus as the first adhesive 45.

The contact portion 51 and the contacted portion 71 as described in the embodiment are not in contact with each other in a state in which the external force is not applied to the fixing plate 80. However, the contact portion 51 and the contacted portion 71 are not limited to such a configuration, and may be in direct contact with each other. In the recording head 1 in which the contact portion 51 and the contacted portion 71 are in direct contact with each other, the deformation of the fixing plate 80 can be reliably prevented, as compared with a case in which the contact portion 51 and the contacted portion 71 are not in contact with each other.

In addition to the contact portion 51 and the contacted portion 71, when the contact portion 52 and the contacted portion 72 are provided, that is, when a plurality of sets of the contact portion and the contacted portion are provided, the contact portion and the contacted portion may be in contact with each other in all the sets, or the contact portion and the contacted portion may be in contact with each other only in any set.

Moreover, the recording head 1 in the present embodiment has an area of the non-contact portion 43 which is larger than those of the contact portion 51 and the contact portion 52, when viewed in the +Z direction which is the ink ejecting direction. That is, the configuration in which the contact portion 51 and the contact portion 52 are provided on a part of the upper portion of the case 13 can improve accuracy of the first dimension H1 by improving surface accuracy of the contact portion 51 and the contact portion 52, as compared with a configuration in which the contact portion is provided on the entire surface other than the adhesive surface 41 on the upper portion of the case 13.

Moreover, the head chip 10 includes the case 13 having the contact portion 51 and the contact portion 52, the contact portion 51 and the contact portion 52 are formed as a part of the upper portion of the case 13. The rigid case 13 abuts the holder 70, such that the deformation of the fixing plate 80 can be reliably prevented.

The head chip 10 includes the flexible substrate 23 coupled to the circuit substrate 95 and raised along the ±Z direction, which is the ink ejecting direction. Thus, the flexible substrate 23 capable of absorbing the tolerance to the ±Z direction can couple the drive circuit 25 of the head chip 10 and the circuit substrate 95 held by the holder 70, such that the inclination of the head chip 10 to the holder 70 in the ±Z direction can be adjusted. The flexible substrate 23 may be raised obliquely with respect to the ±Z direction.

In the present embodiment, the recording head 1 has the contact portion 52 and the contacted portion 72. When the third dimension H3 between the contact portion 52 and the contacted portion 72 is equal to the first dimension H1, the contact portion 51 and the contact portion 52 come into contact with the contacted portion 71 and the contacted portion 72, respectively, by the external force of the fixing plate 80. As such, since the plurality of contact portions come into contact with the contacted portion and receive the external force applied from the fixing plate 80, it is possible to reliably prevent the fixing plate 80 from being deformed. When the third dimension H3 is not equal to the first dimension H1, either the contact portion 51 or the contact portion 52 comes into contact with the contacted portion 71 or the contacted portion 72. That is, the plurality of sets of the contact portion and the contacted portion are provided. Even when the respective sets have different dimensions in the ±Z direction, one of the sets comes into contact with other sets, such that the deformation of the fixing plate 80 can be prevented as described above.

In the present embodiment, the contact portion 51 is disposed on the −X direction side, and the contact portion 52 is disposed on the +X direction side, with respect to a longitudinal direction of the head chip 10 and the center of the head chip 10 in the ±X direction in the present disclosure. By disposing the contact portion 51 and the contact portion 52 as such, the external force applied from the fixing plate 80 is distributed in the +X direction and the −X direction, such that the deformation of the fixing plate 80 can be further prevented.

In the present embodiment, the plurality of caps 9 are separately provided for the respective head chips 10. Therefore, a large load is easily applied to the head chip 10 via the fixing plate 80 as compared with a configuration in which one cap 9 is commonly provided on the plurality of head chips 10. However, even when the separate cap 9 is provided on the plurality of head chips 10, the recording head 1 in the present embodiment can withstand such a large load and prevent the deformation of the fixing plate 80. Further, the plurality of caps 9 are separately provided for the respective head chips 10, such that it is possible to improve a moisture retaining property of the nozzle 11 and prevent clogging or the like. Also, a sealing property of the closed space 9*a* can be improved.

Second Embodiment

Figure 9:
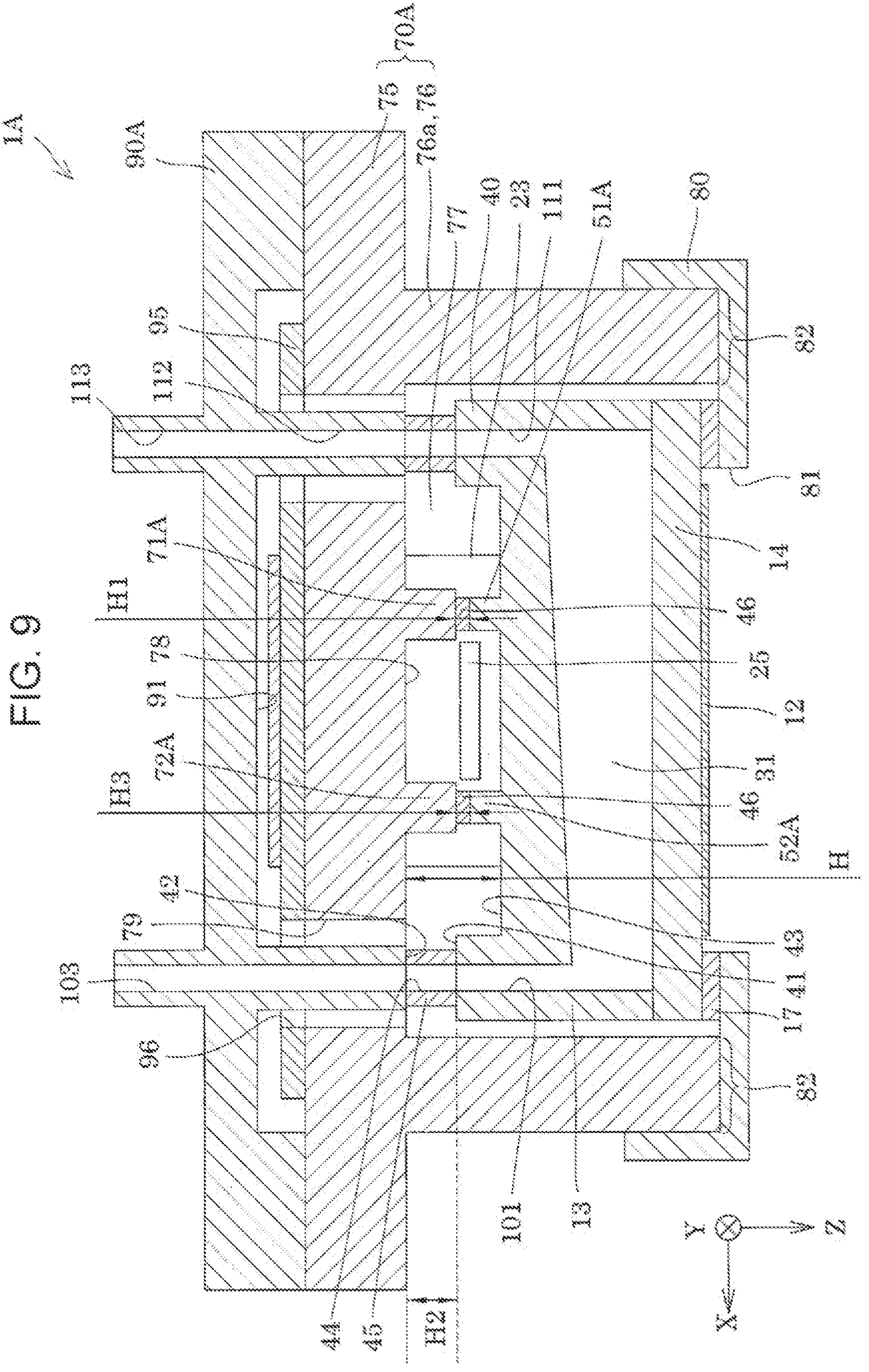
FIG. 9 is a sectional view of a recording head according to a second embodiment.

FIG. 9 is a sectional view of a recording head 1A according to a second embodiment of the present disclosure. In detail, FIG. 9 is a sectional view of the recording head 1 with an appropriately bent sectional line, so as to include the adhesive surface 41, the introduction liquid chamber 31, the first supply flow passage 101, the contact portion 51A, and the contact portion 52A. The same reference numerals will be given to the same members as in the first embodiment in the drawings, and a redundant description thereof will be omitted.

A holder 70A in the present embodiment is not provided with the second supply flow passage 102 and the second discharge flow passage 112 described in the first embodiment. The holder 70A is provided with a second insertion hole 79 penetrating in the ±Z direction.

The third supply flow passage 103 provided in a flow passage member 90A extends in the +Z direction and is inserted through the second insertion hole 79. A surface of the third supply flow passage 103 on the +Z direction side adheres to the first adhesive 45, and the third supply flow passage 103 communicates with the coupling flow passage 44 and the first supply flow passage 101. An opening edge of the third supply flow passage 103 on the +Z direction side is the adhesive surface 42.

The third discharge flow passage 113 provided in the flow passage member 90A extends in the +Z direction and is inserted through the second insertion hole 79. A surface of the third discharge flow passage 113 on the +Z direction side adheres to the first adhesive 45, and the third discharge flow passage 113 communicates with the coupling flow passage 44 and the first discharge flow passage 111. An opening edge of the third discharge flow passage 113 on the +Z direction side is the adhesive surface 42.

The contact portion 51A is located in the +Z direction, which is the ejecting direction, from the adhesive surface 41. Similarly, the contact portion 52A is located in the +Z direction, which is the ejecting direction, from the adhesive surface 41. In addition, a contacted portion 71A protrudes from a surface of the holder 70 facing the head chip 10. Similarly, a contacted portion 72A protrudes from the surface of the holder 70 facing the head chip 10.

A first dimension H1 between the contact portion 51A and the contacted portion 71A is smaller than a second dimension H2. In addition, a third dimension H3 between the contact portion 52A and the contacted portion 72A is smaller than the second dimension H2.

The contact portion 51A and the contacted portion 71A adhere to each other via the second adhesive 46, and the contact portion 52A and the contacted portion 72A adhere to each other via the second adhesive 46. The second adhesive 46 may have the same composition as the first adhesive 45, or may have a different composition. When the second adhesive 46 having the different composition from the first adhesive 45 is used, it is preferable that the second adhesive 46 has a higher Young's modulus than the first adhesive 45. When the silicone-based adhesive is used as the first adhesive 45, an epoxy-based adhesive can be used as the second adhesive 46 having a higher Young's modulus than the first adhesive 45.

The Young's moduli of the contact portion 51A and the contact portion 52A are higher than that of the second adhesive 46. Further, a Young's modulus of the contacted portion 71A and the contacted portion 72A is higher than that of the second adhesive 46.

In the recording head 1A having such a configuration, the adhesive surface 41 and the adhesive surface 42 adhere to each other with the first adhesive 45, and the head chip 10 is fixed to the fixing plate 80. The first dimension H1 is smaller than the second dimension H2, and the third dimension H3 is smaller than the second dimension H2. Therefore, the recording head 1A has the same effect as the recording head 1 in the first embodiment.

The contact portion 51A and the contacted portion 71A adhere to each other via the second adhesive 46. Such a recording head 1A can reliably prevent the deformation of the fixing plate 80 as compared with a case in which the contact portion 51A and the contacted portion 71A are not in contact with each other.

The first adhesive 45 and the second adhesive 46 may be the same type, but the second adhesive 46 preferably has a higher Young's modulus than the first adhesive 45. In the recording head 1A in which the contact portion 51A and the contacted portion 71A adhere to each other via the second adhesive 46 having a higher Young's modulus than the first adhesive 45, the deformation of the fixing plate 80 can be reliably prevented, as compared with a case in which the contact portion 51A and the contacted portion 71A are not in contact with each other, and furthermore, as compared with a case in which an adhesive that has the same Young's modulus as the first adhesive 45 and the second adhesive 46 is used.

Third Embodiment

Figure 10:
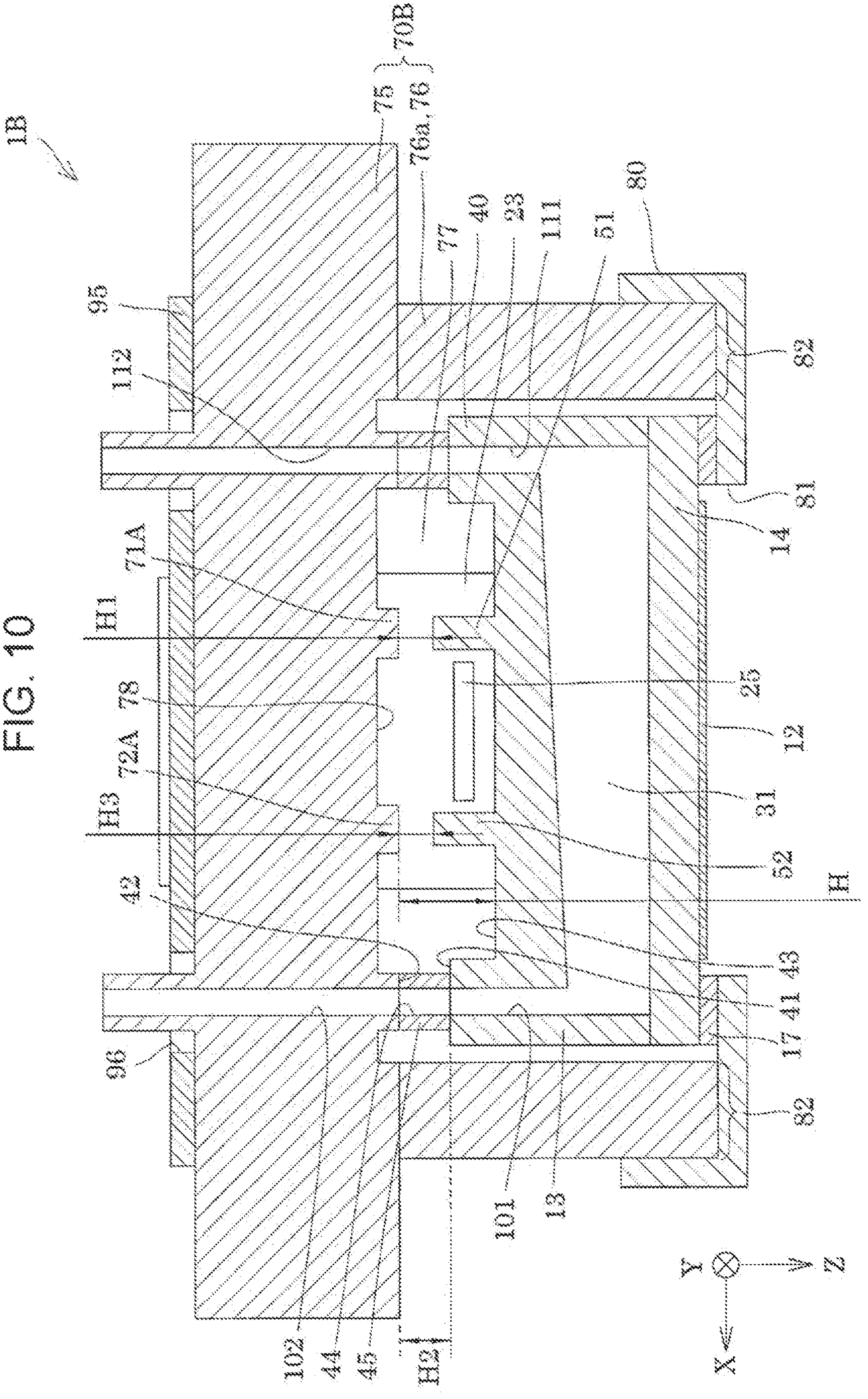
FIG. 10 is a sectional view of a recording head according to a third embodiment.

FIG. 10 is a sectional view of a recording head 1B according to a third embodiment of the present disclosure. In detail, FIG. 10 is a sectional view of the recording head 1 with an appropriately bent sectional line, so as to include the adhesive surface 41, the introduction liquid chamber 31, the first supply flow passage 101, the contact portion 51, and the contact portion 52. The same reference numerals will be given to the same members as in the first and second embodiments in the drawings, and a redundant description thereof will be omitted.

In a recording head 1B in the present embodiment, the circuit substrate 95 is disposed on an upper portion of a holder 70B, that is, on the −Z direction side of the holder 70B.

The second supply flow passage 102 provided in the holder 70B protrudes from the bottom surface 78 in the +Z direction. A surface of the second supply flow passage 102 on the +Z direction side adheres to the first adhesive 45, and the second supply flow passage 102 communicates with the coupling flow passage 44 and the first supply flow passage 101. An opening edge of the second supply flow passage 102 on the +Z direction side is the adhesive surface 42.

The second discharge flow passage 112 provided in the holder 70B protrudes from the bottom surface 78 in the +Z direction. A surface of the second discharge flow passage 112 on the +Z direction side adheres to the first adhesive 45, and the second discharge flow passage 112 communicates with the coupling flow passage 44 and the first discharge flow passage 111. An opening edge of the second discharge flow passage 112 on the +Z direction side is the adhesive surface 42.

In the recording head 1B having such a configuration, the adhesive surface 41 and the adhesive surface 42 adhere to each other with the first adhesive 45, and the head chip 10 is fixed to the fixing plate 80. The first dimension H1 is smaller than the second dimension H2, and the third dimension H3 is smaller than the second dimension H2. Therefore, the recording head 1B has the same effect as the recording head 1 in the first embodiment.

Fourth Embodiment

Figure 11:
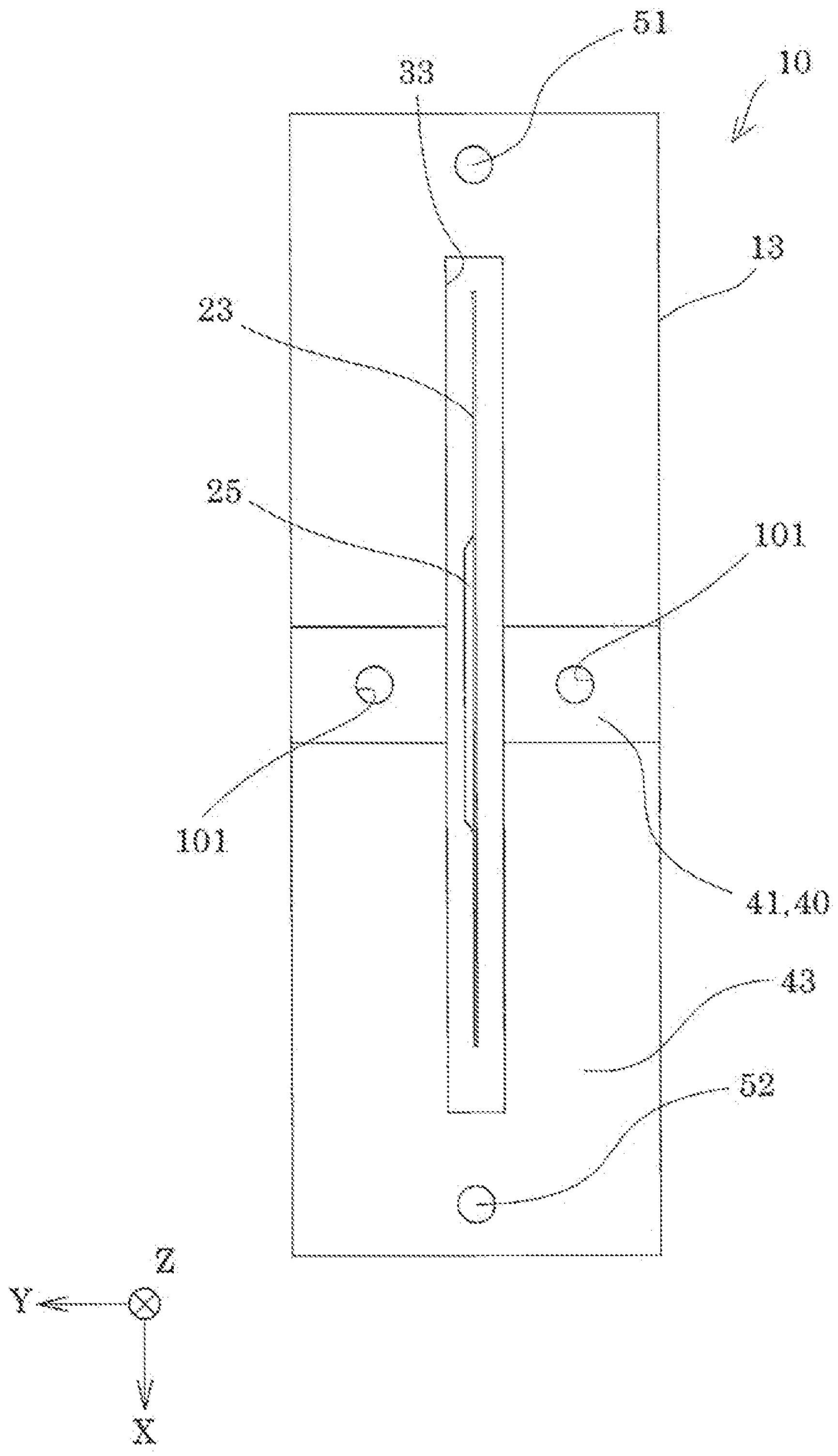
FIG. 11 is a plan view of a head chip according to a fourth embodiment when viewed in the +Z direction.

FIG. 11 is a plan view of the head chip 10 when viewed in the +Z direction. The same reference numerals will be given to the same members as in the first to third embodiments in the drawings, and a redundant description thereof will be omitted.

According to the first to third embodiments, the head chip 10 has a configuration in which the coupling flow passage 44 defined by the first adhesive 45 is disposed on each of an end portion on the +X direction side, which is the longitudinal direction, and an end portion of the −X direction side. That is, in the ±X direction, the head chip 10 has a configuration in which the coupling flow passage 44 is disposed outside thereof and the contact portion 51 and the contact portion 52 are disposed inside thereof. Such a configuration is preferable when the ink is circulated in the head chip 10.

On the other hand, as illustrated in FIG. 11, the head chip 10 according to the present embodiment has a configuration in which the first discharge flow passage 111 is not provided, the first supply flow passage 101 is coupled to each of two common liquid chambers 27 (see FIG. 5), and the coupling flow passage 44 (see FIG. 6) is coupled to the first supply flow passage 101. That is, the head chip 10 does not have a configuration in which the ink is circulated.

According to the present embodiment, the head chip 10 has a configuration in which the contact portion 51 and the contact portion 52 are disposed outside thereof, and the first supply flow passage 101 is disposed inside thereof, in the ±X direction. When the ink is not circulated in the head chip 10, the contact portion 51 and the contact portion 52 are provided on the outside in the ±X direction, which is preferable in terms of strength of the head chip 10.

Other Embodiments

As described above, the embodiments of the present disclosure have been described, but the basic configurations of the present disclosure are not limited to the embodiments described above.

In the embodiments, the contact portion 51 and the contact portion 52 are provided on the head chip 10, but the present embodiment is not limited to the configuration in which the plurality of contact portions are provided. The number of contact portions may be one.

When one contact portion is provided, it is preferable that one contact portion is provided at the center of the head chip 10 in the ±X direction, which is the longitudinal direction of the head chip 10. When two contact portions are provided, it is preferable that the two contact portions are provided on both ends of the head chip 10 in the ±X direction, respectively, as described in the fourth embodiment. It is preferable that four contact portions are provided at four corners at the center of the head chip 10 in the ±X direction, as described in the first embodiment. The "both ends of the head chip in the ±X direction, which is the longitudinal direction of the head chip" means respective parts of three to five parts into which the head chip 10 is virtually divided so as to be arranged in the ±X direction, the respective parts being located closest to both the ends of the head chip. The "center of the head chip in the ±X direction, which is the longitudinal direction of the head chip" means a region of a part inside the parts located closest to both the ends of the head chip described above.

In the embodiments, only a part of the head chip 10 forming the coupling flow passage 44 adheres to the holder 70 with the first adhesive 45. By adhering with the first adhesive 45 as such, the inclination of the head chip 10 in the ±Z direction can be easily adjusted, and an amount of the adhesive used can be reduced. The first adhesive 45 may be applied not only to the part of the head chip 10 forming the coupling flow passage 44 but also to a part other than the part. That is, the first adhesive 45 may be provided between the non-contact portion 43 and the holder 70. Thus, it is possible to firmly fix the head chip 10 by the holder 70.

In the second and third embodiments, the contacted portion 71A, the contacted portion 71B, the contacted portion 72A, and the contacted portion 72B are provided so as to protrude from the bottom surface 78 of the holder 70 to the +Z direction side. However, the present embodiment is not limited to such a configuration. For example, the contacted portion may be provided so as to protrude from the outer peripheral wall 76 of the holder 70 toward the ±X direction or the ±Y direction.

In the embodiments, the fixing plate 80 is directly fixed to the head chip 10, but the present embodiment is not limited to such a configuration. For example, a reinforcing plate may be provided between the fixing plate 80 and the head chip 10, and the fixing plate 80 may be indirectly fixed to the head chip 10 through the reinforcing plate.

As long as the first dimension H1, the second dimension H2, and the third dimension H3 satisfy the relationships described above, the adhesive surface 41, the contact portion 51, the contact portion 51A, the contact portion 52, and the contact portion 52A may protrude in the −Z direction from the non-contact portion 43, or may be flush with the non-contact portion 43 or recessed in the +Z direction side from the non-contact portion 43.

As long as the first dimension H1, the second dimension H2, and the third dimension H3 satisfy the relationships described above, the adhesive surface 42, the contacted portion 71, the contacted portion 71A, the contacted portion 72, and the contacted portion 72A may protrude from the bottom surface 78 facing the head chip 10 of the holder 70 to the +Z direction side, or may be flush with the bottom surface 78 or recessed in the −Z direction from the bottom surface 78.

Furthermore, the present disclosure is intended for a wide range of the liquid ejecting head. For example, the present disclosure can be also applied to recording heads such as various ink jet recording heads used in image recording apparatuses such as printers, coloring material ejecting heads used in manufacturing color filters for liquid crystal displays, and the like, electrode material ejecting heads used for electrode formation such as organic electroluminescent (EL) displays, field emission displays (FEDs), bio-organic matter ejecting heads used in biochip manufacturing, and the like. Although the ink jet recording apparatus has been described as an example of the liquid ejecting apparatus, a liquid ejecting apparatus using other liquid ejecting heads described above can be also used.

What is claimed is:

1. A liquid ejecting head comprising:

a first head chip having first nozzles configured to eject a liquid in an ejecting direction;

a holder holding the first head chip; and a fixing plate to which the holder and the first head chip are fixed, having a first opening for exposing the first nozzles to an outside, wherein a first adhesive surface formed with an opening of a flow passage is provided on an upper portion of the first head chip, the holder accommodates the first head chip between the holder and the fixing plate, and has a second adhesive surface formed with an opening of a flow passage communicating with the first head chip, the first adhesive surface and the second adhesive surface adhere to each other with a first adhesive so as to define a coupling flow passage that couples the flow passage communicating with the first head chip of the holder and the flow passage of the first head chip, the upper portion of the first head chip has a first contact portion, the holder has a first contacted portion facing the first contact portion, and a first dimension in the ejecting direction between the first contact portion and the first contacted portion is smaller than a second dimension in the ejecting direction between the first adhesive surface and the second adhesive surface.

2. The liquid ejecting head according to claim 1, wherein the first contact portion and the first contacted portion are in direct contact with each other.

3. The liquid ejecting head according to claim 1, wherein the first contact portion and the first contacted portion adhere to each other via a second adhesive.

4. The liquid ejecting head according to claim 3, wherein the second adhesive has a higher Young's modulus than the first adhesive.

5. The liquid ejecting head according to claim 1, wherein each of the first contact portion and the first contacted portion has a higher Young's modulus than the first adhesive.

6. The liquid ejecting head according to claim 1, wherein the upper portion of the first head chip has a non-contact portion that does not come into contact with the holder, and a dimension between the non-contact portion and a part of the holder facing the non-contact portion is larger than the second dimension.

7. The liquid ejecting head according to claim 6, wherein the first adhesive surface and the first contact portion are disposed with the non-contact portion being interposed therebetween, when viewed in the ejecting direction.

8. The liquid ejecting head according to claim 6, wherein an area of the non-contact portion is larger than an area of the first contact portion, when viewed in the ejecting direction.

9. The liquid ejecting head according to claim 1, wherein the first head chip has a case having the first contact portion, and the first contact portion is a part of an upper portion of the case.

10. The liquid ejecting head according to claim 1, wherein the first dimension is a minimum dimension between the first contact portion and the first contacted portion and the second dimension is a minimum dimension between the first adhesive surface and the second adhesive surface.

11. The liquid ejecting head according to claim 1, wherein the second adhesive surface faces in the ejecting direction.

12. The liquid ejecting head according to claim 1, wherein the first contact portion is located in a direction opposite to the ejecting direction from the first adhesive surface.

13. The liquid ejecting head according to claim 1, wherein the first contact portion is located in the ejecting direction from the first adhesive surface, and the first contacted portion protrudes from a surface of the holder facing the first head chip.

14. The liquid ejecting head according to claim 1, wherein the holder has an outer peripheral wall surrounding the first head chip at an interval from the first head chip, and a tip of the outer peripheral wall in the ejecting direction is fixed at a fixed position of the fixing plate.

15. The liquid ejecting head according to claim 1, wherein the upper portion of the first head chip has a second contact portion, the holder has a second contacted portion facing the second contact portion, and a third dimension between the second contact portion and the second contacted portion is smaller than the second dimension.

16. The liquid ejecting head according to claim 15, wherein the first contact portion is disposed on one side with respect to a center of the first head chip in a longitudinal direction of the first head chip, and the second contact portion is disposed on another side with respect to the center of the first head chip in the longitudinal direction of the first head chip.

17. The liquid ejecting head according to claim 1, further comprising:

a second head chip having second nozzles configured to eject the liquid, wherein the fixing plate has a second opening for exposing the second nozzles to the outside and is fixed to the second head chip, the second head chip is accommodated between the holder and the fixing plate at an interval from the first head chip, a third adhesive surface formed with an opening of a flow passage is provided on an upper portion of the second head chip, the holder has a fourth adhesive surface formed with an opening of a flow passage communicating with the second head chip, the third adhesive surface and the fourth adhesive surface adhere to each other with the first adhesive so as to define a coupling flow passage that couples the flow passage communicating with the second head chip of the holder and the flow passage of the second head chip, the upper portion of the second head chip has a third contact portion, the holder has a third contacted portion facing the third contact portion, and a fourth dimension between the third contact portion and the third contacted portion is smaller than the second dimension.

18. A liquid ejecting apparatus comprising:

the liquid ejecting head according to claim 1; and a transport portion configured to transport a medium.

19. The liquid ejecting apparatus according to claim 18, further comprising:

a cap relatively moving to the fixing plate in a direction opposite to the ejecting direction to come into contact with the fixing plate, wherein the holder has an outer peripheral wall surrounding the first head chip at an interval from the first head chip, a tip of the outer peripheral wall in the ejecting direction is fixed at a fixed position of the fixing plate, and the cap comes into contact with the fixing plate inside from the fixed position to form a closed space in which the first nozzles are opened.

20. A liquid ejecting apparatus comprising:

the liquid ejecting head according to claim 17; and a first cap and a second cap relatively moving to the fixing plate in a direction opposite to the ejecting direction to come into contact with the fixing plate, wherein the holder has an outer peripheral wall surrounding the first head chip at an interval from the first head chip, a tip of the outer peripheral wall in the ejecting direction is fixed at a fixed position of the fixing plate, the first cap comes into contact with the fixing plate inside from the fixed position and at a position overlapping with the first head chip when viewed in the ejecting direction, to form a closed space in which the first nozzles are opened, and the second cap comes into contact with the fixing plate inside from the fixed position and at a position overlapping with the second head chip when viewed in the ejecting direction, to form a closed space in which the second nozzles are opened.

* * * * *